US007828215B2

(12) United States Patent
Chung et al.

(10) Patent No.: US 7,828,215 B2
(45) Date of Patent: Nov. 9, 2010

(54) READER FOR AN OPTICALLY READABLE BALLOT

(75) Inventors: Kevin Kwong-Tai Chung, Princeton, NJ (US); Xiaoming Shi, Highland Park, NJ (US); Victor Jun Dong, Edison, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 1216 days.

(21) Appl. No.: 11/433,696

(22) Filed: May 12, 2006

(65) Prior Publication Data

US 2006/0202031 A1 Sep. 14, 2006

Related U.S. Application Data

(63) Continuation of application No. 10/924,037, filed on Aug. 23, 2004, now abandoned, and a continuation-in-part of application No. 10/410,824, filed on Apr. 10, 2003, now Pat. No. 7,077,313, which is a continuation-in-part of application No. 10/260,167, filed on Sep. 30, 2002, now Pat. No. 6,892,944.

(60) Provisional application No. 60/498,012, filed on Aug. 25, 2003, provisional application No. 60/549,297, filed on Mar. 2, 2004, provisional application No. 60/575,198, filed on May 27, 2004, provisional application No. 60/326,265, filed on Oct. 1, 2001, provisional application No. 60/341,633, filed on Dec. 19, 2001, provisional application No. 60/377,824, filed on May 7, 2002, provisional application No. 60/382,033, filed on May 20, 2002, provisional application No. 60/385,118, filed on May 30, 2002, provisional application No. 60/398,635, filed on Jun. 17, 2002, provisional application No. 60/403,151, filed on Aug. 12, 2002.

(51) Int. Cl.
*G06K 7/10* (2006.01)

(52) U.S. Cl. .......................... 235/454; 235/386; 705/12

(58) Field of Classification Search ................. 235/386, 235/454; 705/12
See application file for complete search history.

(56) References Cited

U.S. PATENT DOCUMENTS 3,163,758 A 12/1964 Treacy (Continued)

FOREIGN PATENT DOCUMENTS

| | | |
|---|---|---|
| EP | 0199683 | 10/1986 |
| EP | 0556853 | 8/1993 |
| IT | 1234224 | 5/1992 |
| JP | 7-57014 | 3/1995 |
| JP | 9-160988 | 6/1997 |
| WO | 96/02044 | 1/1996 |
| WO | 00/79469 | 12/2000 |
| WO | WO 02/31629 A2 | 4/2002 |

OTHER PUBLICATIONS

Holli Riebeek, "Brazil Holds All-Electronic National Election", Oct. 15, 2002, 1 page.

(Continued)

*Primary Examiner*—Allyson N Trail
(74) *Attorney, Agent, or Firm*—Clement A. Berard, Esq.; Dann, Dorfman, Herrell & Skillman, PC

(57) ABSTRACT

A ballot reader images a ballot, checks the ballot, and displays the ballot image for voter review. The voter may cast the ballot causing it to be collected and the vote thereon recorded, or may have the ballot returned. Checking may include, e.g., checking for a complete ballot, undervotes and/or overvotes.

25 Claims, 4 Drawing Sheets

U.S. PATENT DOCUMENTS 3,648,022 A 3/1972 Cook
3,653,587 A 4/1972 Hammond et al.
3,710,105 A 1/1973 Oxendine, Jr. et al.
3,722,793 A 3/1973 Aronoff
3,739,151 A 6/1973 Moldovan, Jr. et al.
3,790,072 A 2/1974 Moldovan, Jr.
3,900,961 A 8/1975 Sokolski et al.
3,941,976 A 3/1976 Huhn
3,944,788 A 3/1976 Comisar et al.
3,977,357 A 8/1976 O'Neal et al.
4,010,353 A 3/1977 Moldovan, Jr. et al.
4,015,106 A 3/1977 De Phillipo
4,021,780 A 5/1977 Narey et al.
4,101,784 A 7/1978 Key et al.
4,153,895 A 5/1979 Weisbrod et al.
4,300,123 A 11/1981 McMillin et al.
4,357,596 A 11/1982 Feilchenfeld
4,459,021 A 7/1984 Blazek
4,479,194 A 10/1984 Fogg et al.
4,641,240 A 2/1987 Boram
4,649,264 A 3/1987 Carson
4,724,307 A 2/1988 Dutton et al.
4,760,247 A 7/1988 Keane et al.
4,774,665 A 9/1988 Webb
4,807,908 A 2/1989 Gerbel
4,813,708 A 3/1989 Narey
4,968,873 A 11/1990 Dethloff et al.
5,038,392 A 8/1991 Morris et al.
5,073,700 A 12/1991 D'Onofrio
5,085,587 A 2/1992 DesForges et al.
5,103,490 A 4/1992 McMillan
5,126,731 A 6/1992 Cromers, Jr.
5,134,669 A 7/1992 Keogh et al.
5,164,601 A 11/1992 Nordstrom
5,191,525 A 3/1993 LeBrun et al.
5,213,373 A 5/1993 Ramos
5,218,528 A 6/1993 Wise et al.
5,221,831 A 6/1993 Geiszler
5,247,166 A 9/1993 Cannon et al.
5,248,872 A 9/1993 Stewart
5,257,011 A 10/1993 Beigel
5,272,318 A 12/1993 Gorman
5,278,753 A 1/1994 Graft, III
5,365,026 A 11/1994 Cromer, Jr. et al.
5,377,099 A 12/1994 Miyagawa
5,396,218 A 3/1995 Olah
5,400,248 A 3/1995 Chisholm
5,416,308 A 5/1995 Hood et al.
5,452,379 A 9/1995 Poor
5,474,295 A 12/1995 Demshuk
5,495,532 A 2/1996 Kilian et al.
5,497,318 A 3/1996 Miyagawa et al.
5,548,326 A 8/1996 Michael
5,566,327 A 10/1996 Sehr
5,572,601 A 11/1996 Bloomberg
5,583,329 A 12/1996 Davis, III et al.
5,585,612 A 12/1996 Harp, Jr.
5,610,383 A 3/1997 Chumbley
5,612,870 A 3/1997 Welner
5,631,984 A 5/1997 Graf et al.
5,635,726 A 6/1997 Zavislan et al.
5,640,200 A 6/1997 Michael
5,661,470 A 8/1997 Karr
5,672,060 A 9/1997 Poor
5,675,628 A 10/1997 Hokkanen
5,710,420 A 1/1998 Martin et al.
5,711,673 A 1/1998 Grundy, Jr.
5,719,386 A 2/1998 Hsieh et al.
5,732,222 A 3/1998 Miyagawa et al.
5,758,325 A 5/1998 Lohry et al.
5,821,508 A 10/1998 Willard
5,875,432 A 2/1999 Sehr
5,878,399 A 3/1999 Peralto
5,936,527 A 8/1999 Isaacman et al.
5,978,466 A 11/1999 Quattrocchi
5,987,149 A 11/1999 Poor
6,005,680 A 12/1999 Luther et al.
6,014,438 A 1/2000 Quattrocchi
6,077,106 A 6/2000 Mish
6,078,928 A 6/2000 Schnase et al.
6,081,793 A 6/2000 Challener et al.
6,092,051 A 7/2000 Kilian et al.
6,097,301 A 8/2000 Tuttle
6,112,240 A 8/2000 Pogue et al.
6,173,154 B1 1/2001 Kucinski et al.
6,176,429 B1 1/2001 Reddersen et al.
6,250,548 B1 6/2001 McClure et al.
6,287,765 B1 9/2001 Cubicciotti
6,366,777 B1 4/2002 Uusitalo
6,412,692 B1 7/2002 Miyagawa
6,418,372 B1 7/2002 Hofmann
6,427,073 B1 7/2002 Kortesalmi et al.
6,457,643 B1 10/2002 Way
6,505,778 B1 1/2003 Reddersen et al.
6,540,138 B2 4/2003 Hall et al.
6,550,675 B2 4/2003 Davis et al.
6,581,824 B1 6/2003 McClure et al.
6,607,126 B2 8/2003 Altini et al.
6,607,137 B2 8/2003 Morales
6,641,033 B2 11/2003 McClure et al.
6,662,998 B2 12/2003 McClure et al.
6,688,517 B1 2/2004 McClure et al.
6,726,090 B1 4/2004 Kargel
6,739,508 B2 5/2004 Ushioda et al.
6,741,738 B2 5/2004 Taylor
6,769,613 B2 8/2004 McDermott
6,779,727 B2 8/2004 Warther
6,799,723 B2 10/2004 Kotob et al.
6,817,515 B2 11/2004 Winnett
6,854,644 B1 2/2005 Bolton et al.
6,865,543 B2 3/2005 Gibbs, Sr.
6,942,142 B2 9/2005 Barmettler et al.
6,968,999 B2 11/2005 Reardon
7,032,821 B2 4/2006 McClure et al.
7,080,779 B2 7/2006 Cummings
7,100,828 B2 9/2006 Cummings
7,117,356 B2 10/2006 LaCous
7,128,263 B1 10/2006 Nguyen et al.
7,152,045 B2 12/2006 Hoffman
7,152,792 B2 12/2006 Gaston
7,178,730 B1 2/2007 Jamison et at
7,222,787 B2 5/2007 Cummings
7,231,082 B2 6/2007 Lenoir
7,243,846 B2 7/2007 Reardon
2001/0035455 A1 11/2001 Davis et al.
2002/0029163 A1 3/2002 Joao
2002/0072961 A1 6/2002 McDermott et al.
2002/0074399 A1 6/2002 Hall et al.
2002/0078358 A1 6/2002 Neff et al.
2002/0084325 A1 7/2002 Reardon
2002/0091673 A1 7/2002 Seibel et al.
2002/0092908 A1 7/2002 Chumbley
2002/0133396 A1 9/2002 Barnhart
2002/0161628 A1* 10/2002 Poor et al. .................... 705/12
2002/0169756 A1 11/2002 Biddulph
2002/0175514 A1 11/2002 Warther
2002/0194060 A1 12/2002 Chernomorov
2003/0034393 A1 2/2003 Chung et al.
2003/0042731 A1 3/2003 Li
2003/0062411 A1 4/2003 Chung
2003/0066872 A1* 4/2003 McClure et al. ............... 235/51
2003/0173404 A1* 9/2003 Chung et al. ................ 235/386
2004/0016803 A1 1/2004 Cummings
2004/0046021 A1 3/2004 Chung

| | | | | |
|---|---|---|---|---|
| 2004/0060983 | A1 | 4/2004 | Davis et al. | |
| 2004/0169077 | A1 * | 9/2004 | Petersen et al. | 235/386 |
| 2004/0195323 | A1 | 10/2004 | Vadura et al. | |
| 2004/0217168 | A1 * | 11/2004 | Cummings | 235/386 |
| 2005/0092835 | A1 | 5/2005 | Chung | |
| 2005/0161507 | A1 | 7/2005 | Openshaw, Jr. et al. | |
| 2005/0211778 | A1 | 9/2005 | Biddulph | |
| 2006/0000906 | A1 | 1/2006 | Reardon | |

OTHER PUBLICATIONS

Mike He, Rogerio Almeida and Edson Gissoni, "National Semiconductor and Unisys Equip Brazil with New Voting Machines for Fast and Accurate Election Results in the Fall", National Semiconductor, http://www.national.com/news/item/0,735,757,00.html, May 6, 2002, 3 pages.

Rebecca Mercuri, "A Better Ballot Box?", IEEE Spectrum, Oct. 2002, pp. 46-50.

Peter G. Neumann, "Security Criteria for Electronic Voting", http://www.csl.sri.com/users/neumann/ncs93.html, c 1993, 7 pages.

E-mail message from: R. Mercuri [notable@mindspring.com] To: Clement Berard; plesko @simmonscooper.corn, "Avante Patent 7036730 and infringement suit", Jul. 13, 2006, 4 pages.

Rebecca Mercuri, "Electronic Voting", http://web.archive.org/web20010201193800/http://www.notablesoftware.com/; updated Jan. 28, 2001; 11 pages.

Bruce Schneier, Crypto-Gram Newsletter, Dec. 15, 2000, http://www.counterpane.com; 17 pages (from www.schneier.com/crypto-gram-0012.html).

Rebecca Mercuri, Explanation of Voter-Verified Ballot Systems, The Risks Digest, ACM Comm. on Computers & Public Policy, vol. 22: 17, Jul. 24, 2002, 15:54:47/0400, 2 pages.

Yahoo Finance, Press Release, Inventor of Electronic Voting Verification System Takes Industry Giants to Court for Patent Infringement; Wed., Jul. 12, 2006 11:19 am, 2 pages.

Rebecca Mercuri, "Why Computers Shouldn't Count Votes", Princeton ACM/IEEE Computer Society Chapters, Nov. 2000 Joint Meeting, Thurs. Nov. 16, 2000, 8:00 pm, 2 pages.

Douglas Dixon, Technology & The Polls: Rebecca Mercuri, Nov. 15, 2000 U.S. 1 Newspaper, Princeton1info.com, http://notablesoftware.com/Press/dixon.html, 7 pages.

Rebecca Mercuri, "Electronic Vote Tabulation Checks & Balances", Dissertation, 2001, Presented to Faculty of Univ. of Pennsylvania, 235 pages.

R. Mercuri, The FEC Proposed Voting Systems Standard Update, A Detailed Comment, Submitted to Fed. Election Commission, Sep. 10, 2001, FEC Not 2001-9. vol. 66, No. 132, 8 pages.

Terri Gauchat, [Abstract] Computer Assisted Vote Tallying, An Overview of the Problems, Implications, and Solutions, Univ. of Waterloo, Term Res Project, Apr. 11, 1991, 14 pages.

Ltr. to Paul Lesko, Esq. Jun. 28, 2006, Re: U.S. Appl. No. 10/255,348, "Electronic Voting Apparatus, System and Method", From Nancy L. Reeves, Walker & Jocke, 5 pages.

Document submitted to Patent Office, Archive Date Jul. 11, 2000, ACCUVote-TS, http://web.archive.org/web/20000711160152/www.globalelection.com., 5 pages.

AccuVote TS reference, Archive Date Oct. 12, 1999, http://web.archive.org/web/19991012074217/www.gesn.com/Product..., 3 pages.

Roy G. Saltman, Accuracy, Integrity, and Security in Computerized Vote-Tallying, Computer Science & Technology, NBS Special Pub. 500-158, Aug. 1998, 109 pages.

Michael Ian Shamos, CFP'93—Electronic Voting—Evaluating the Threat, Mar. 1993, CPSR, http://web.archive.org/web20011224071421/www.cpsr.org/conference..., 9 pages.

Description of AccuVote OS, Archived Oct. 12, 1999, "The AccuVote" http://web.archive.org/web/19991012093810/www.gesn.com/Product. 3 pages.

Description of GEMS, Archived Nov. 9, 1999, "Global Election Management System," http://web.archive.org/web/19991109003219/www.gesn.com/Product... 4 pages.

Excerpts from current AccuVote TSX Pollworkers Guide, AccuVote-TSX Pollworker's Guide, Diebold Election Systems, Revision 5.0, Mar. 22, 2005, 3 pages.

Caltech-MIT, "Voting What is What Could Be", Jul. 2001, 95 pages.

Rebecca Mercuri, "Rebecca Mercuri's Statement on Electronic Voting", http://www.notablesoftware.com/RMstatement.html, Copyright c2001, 2 pages.

Rebecca Mercuri, "Electronic Voting", http://www.notablesoftware.com/evote.html, Oct. 15, 2001, 8 pages.

Bruce Schneier, "Voting and Technology," from Crypto-Gram Newsletter, Dec. 15, 2000, http://www.notablesoftware.com/press/schneier.html; 3 pages.

"Diebold Election Systems, Inc.'s Invalidity Contentions for the '944 and '730 Patents", *Avante International Technology Corporation*, Plaintiff, v. *Diebold Election Systems, et al*, Defendants; United States Easter District of Missouri Eastern Division: Cause No. 4:06-cv-00978 TCM, Nov. 28, 2006.

"Defendant Election Systems and Software, Inc.'s Preliminary Invalidity Contentions", *Avante International Technology Corporation*, Plaintiff, v. *Diebold Election Systems, et al*, Defendants; United States Easter District of Missouri Eastern Division: Cause No. 4:06-cv-00978 TCM, Nov. 30, 2006.

"Sequoia Voting Systems' Preliminary Invalidity Contentions", *Avante International Technology Corporation*, Plaintiff, v. *Diebold Election Systems, et al*, Defendants; United States Easter District of Missouri Eastern Division: Cause No. 4:06-cv-00978 TCM, Nov. 28, 2006.

Letter, Paul A. Lesko, (Simons Cooper) to Clement Berard, "*Avante International Technology Corporation* vs. *Diebold Election Software et al*, Cause No. 4:06-cv-00978 TCM" dated Dec. 5, 2006.

Rebecca Mercuri, *Voting-Machine Risks*, Nov. 11, 1992.

*The Risks Digest*, vol. 2, Issue 22, Mar. 1986, 4 pages, includes inter alia: Michael McGlaughlin, *Voting Receipt*, http://catless.ncl.ac.uk/Risks/2.22.html Tom Benson, *Computerized Voting*, http://catless.ncl.ac.uk/Risks/2.22.html.

*The Risks Digest*, vol. 2, Issue 24, Mar. 1986, 4 pages, includes inter alia: Kurt Hyde, *Progress Report on Computerized Voting*, http://catless.ncl.ac.uk/Risks/2.24.html.

*The Risks Digest*, vol. 10, Issue 78, Jan. 1991, 6 pages, includes inter alia: Evan Ravitz, *Voting by Phone*, http://catless.ncl.ac.uk/Risks/10.78.html.

Strini Giorgio, "Data Capture and Processing Device, Particularly for Voting and Associated Polling", Abstract of IT No. 1234224, Patent for Industrial Invention, Date: May 6, 1992.

Bruce Schneier, *Applied Cryptography*, Second Edition 1996, Cover and title pages, Chapter 6, pp. 125-147, 170-175 185-187 and 587.

Rebecca Mercuri, "Physical Verifyability of Computer Systems", *Secure Networks*, Proceedings: Fifth International Computer Virus & Security Conference, 1992, 6 pages.

*The Risks Digest*, vol. 2, Issue 23, Mar. 1986, 5 pages.

*The Risks Digest*, vol. 16, Issue 52, Oct. 1994, 11 pages.

*The Risks Digest*, vol. 21, Issue 10, Nov. 7, 2000, 10 pages.

*The Risks Digest*, vol. 22, Issue 66, Apr. 1, 2003, 11 pages.

*The Risks Digest*, vol. 22, Issue 54, Feb. 3, 2003, 11 pages.

Granite Creek Technology Incorporated Report No. OR9202, "Certification Tests of the OPTECH IV-C Model 400 Central Ballot Tabulator", Jul. 7, 1992, 14 pages (S003596-S003609).

Granite Creek Technology Incorporated Report No. KS9305, "Certification Tests of the OPSCAN 5/TeamWork Electronic Voting System", Dec. 15, 1993, 10 pages (S003656-S003655).

CJvK Translation 10206 It:Eng Patent Application No. 1234224; prepared May 6, 1992; 22 pages.

A. Riera, J. Borrell, J. Rifa, "An uncoercible verifiable electronic voting protocol," Proceedings of IFIP SEC '98, Online, Sep. 4, 1998, XP002272039, 10 Pages.

D. Dill, R. Mercuri, P. Neumann, D. Wallach, "Frequently Asked Questions about DRE Voting Systems", http://www.verifiedvoting.org/drefaq.asp, printed Aug. 24, 2004, 7 pages.

The Open Voting Consortium, "Frequently Asked Questions (FAQ)", © 2004 http://www.openvotingconsortium.orq/faq.html, printed Aug. 24, 2004, 17 pages.

Verified Voting Foundation, "E-Voting Misconceptions", http://www.verifiedvoting.org/article.asp?id+2609, printed Aug. 24, 2004, 3 pages.
A. Dechert, "Statement at Utah State Capital", Jul. 13, 2004, http://www.openvotingconsortium.org/ad/alan-ut-7-13.html, printed Aug. 24, 2004, 2 pages.
M. Shamos, "Paper v. Electronic Voting Records—An Assessment", Apr. 2004, http://euro.ecom.cmu.edu/people/faculty/mshamos/paper.htm, printed Aug. 24, 2004, 20 pages.
A. Dechert, "OVC Response to Paper v. Electronic Voting Records—An Assessment, by Michael Ian Shamos", Jul. 30, 3004, http://gnosis.python-hosting.com/voting-project/July2004/0240.html, printed Aug. 24, 2004, 6 pages.
K. Zetter, "California Bans E-Vote Machines", Apr. 30, 2004, http://www.wirednew.com/news/evote/0,2645,63298,00.html?tw=wn_story_page_prev2, printed Jun. 22, 2004, 3 pages.
Associated Press "Prototype E-Vote Printer Fails to Satisfy", © 2005, Feb. 3, 2005, 2 pages, http://start.earthlink.net/channel/news/print?guid=20050203/4201afd0_3ca6_15526200502....
R. Mercuri, "Computer Security Act and Computerized Voting Systems", Nov. 27, 1992, Risks Digest vol. 14: Issue 11, pp. 3-4.
Westinghouse DataScore Systems, "Optical Mark Reader Systems", no date marked; prior to Mar. 30, 2007; 13 pages.
Tallone, "Business Point of View: A Better Voting System", ca. 2004, 2 pages.
Election Systems & Software, "Integrated Hardware Solutions", © 2001 (on last sheet, but date "Oct. 6, 2004" on sheet AV-17423), 14 pages.
National Computer Systems, "Precept Image System", © 1991 or 1992, 10 pages.
*The Risks Digest*, vol. 21: Issue 23; Jan. 30, 2001; 12 pages.
*Defendants' Preliminary Claim Construction and Preliminary Identification of Extrinsic Evidence, Avante International Technology Corporation*, Plaintiff, v. *Diebold Election Systems, et al*, Defendants; United States Easter District of Missouri Eastern Division: Cause No. 4:06-cv-00978 TCM, Apr. 17, 2007, 3 pages.
*Defendants' Proposed Construction for 730 Patent, Avante International Technology Corporation*, Plaintiff, v. *Diebold Election Systems, et al*, Defendants; United States Easter District of Missouri Eastern Division: Cause No. 4:06-cv-00978 TCM, Apr. 17, 2007, 23 pages.
*Defendants' Proposed Construction for '944 Patent, Avante International Technology Corporation*, Plaintiff, v. *Diebold Election Systems, et al*, Defendants; United States Easter District of Missouri Eastern Division: Cause No. 4:06-cv-00978 TCM, Apr. 17, 2007, 17 pages.
*Defendants' Proposed Construction for '313 Patent, Avante International Technology Corporation*, Plaintiff, v. *Diebold Election Systems, et al*, Defendants; United States Easter District of Missouri Eastern Division: Cause No. 4:06-cv-00978 TCM, Apr. 17, 2007, 6 pages.
*Joint Claim Construction and Prehearing Statement, Avante International Technology Corporation*, Plaintiff, v. *Diebold Election Systems, et al*, Defendants; United States Easter District of Missouri Eastern Division: Cause No. 4:06-cv-00978 TCM, Apr. 24, 2007, 63 pages.
*Defendants' Initial Claim Construction Brief, Avante International Technology Corporation*, Plaintiff, v. *Diebold Election Systems, et al*, Defendants; United States Easter District of Missouri Eastern Division: Cause No. 4:06-cv-00978 TCM, May 8, 2007, 245 pages.
"*Motion for Leave to File Amended Counterclaim" and "Amended Answer and Counterclaim of Diebold Election Systems", Avante International Technology Corporation*, Plaintiff, v. *Diebold Election Systems, et al*, Defendants; United States Easter District of Missouri Eastern Division: Cause No. 4:06-cv-00978 TCM, May 14, 2007, 40 pages.
"*Defendant Election Systems & Software, Inc's Motion for Leave to File First Amended Answer to Plaintiff's Third Amended Complaint and Memorandum of Law in Support of Motion" and "First Amended Answer of Election Systems & Software, Inc. To Plaintiff's Third Amended Complaint and Amended Counterclaim of Election Systems & Software, Inc.", Avante International Technology Corporation*, Plaintiff, v. *Diebold Election Systems, et al*, Defendants; United States Easter District of Missouri Eastern Division: Cause No. 4:06-cv-00978 TCM, May 14, 2007, 30 pg.
"*Defendant Sequoia Voting Systems' Motion for Leave to Amend Its Answer, Affirmative Defenses and Counterclaims to State Additional Facts Supporting Its Counterclaim for Inequitable Conduct" and "Amended Answer, Affirmative Defenses and Counterclaims of Sequoia Voting Systems", Avante International Technology Corporation*, Plaintiff, v. *Diebold Election Systems, et al*, Defendants; United States Easter District of Missouri Eastern Division: Cause No. 4:06-cv-00978 TCM, May 14, 2007, 35 pages.
*Defendants' Response to Plaintiff Avante's Claim Construction Brief, Avante International Technology Corporation*, Plaintiff, v. *Diebold Election Systems, et al*, Defendants; United States Easter District of Missouri Eastern Division: Cause No. 4:06-cv-00978 TCM, May 21, 2007, 64 pg.
Global Election Systems, Inc., "AccuVote-TS", http://www.archive.org/web/20000830141622/http:/www.gesn.com/AccuVote-TS/accuvot..., Web Archive date Aug. 30, 2000, 4 pages.
VoteHere, Inc., "November Election in Arizona and California will be first-ever cooperative trial of online voting", "VoteHere Platinum" and "VoteHere Gold", http://web.archive.org/web/20001019071003/votehere.net/VH-Content-v2.0/default.htm, Web Archive date Oct. 19, 2000, 5 pages.
Diebold Election Systems, "Election Solutions Diebold Election Systems Solutions", "Election Solutions AccuVote-TS", "Election Solutions AccuVote-OS", and "Election Solutions Global Election Management System—GEMS", http://web.archive.org/web/20020811050628/www.diebold.com/solutions/election/solutio..., Web Archive date Oct. 3, 2002, 10 pages.
Peripheral Dynamics, Inc., "PAGESCAN II", no date marked; prior to Mar. 29, 2007; 2 pages.
Avante International Technology, Inc., "Optical Vote-Trakker: A "Mark-Sense" Absentee & Precinct-Based Voting System that Minimizes Both Voter and System Errors", Jan. 2004, 7pg.
European Patent Office, "Communication Pursuant to Article 96(2) EPC", Application No. 01273930.6, May 8, 2004, 10 pages.
European Patent Office, "Communication Pursuant to Article 96(2) EPC", Application No. 01273930.6, Jun. 20, 2005, 10 pages.
European Patent Office, Communication, Application No. 01273930.6, Oct. 15, 2004, 8 pages.
D. Dixon, "Technology & the Polls: Rebecca Mercuri", Nov. 15, 2000, 8 pages.
*Motion for Partial Summary Judgment, Avante International Technology Corporation, Plaintiff*, v. *Diebold Election Systems, et al*, Defendants; United States Easter District of Missouri Eastern Division: Cause No. 4:06-cv-00978 TCM, Jun. 15, 2007, 3 pages.
*Memorandum in Support of Election Systems & Software Inc.'s Motion for Partial Summary Judgment of Invalidity of Certain Claims of the '944 Patent (with Exhibits), Avante International Technology Corporation*, Plaintiff, v. *Diebold Election Systems, et al*, Defendants; United States Easter District of Missouri Eastern Division: Cause No. 4:06-cv-00978 TCM, Jun. 15, 2007, 34 pages.
*Motion for Leave to File Suggestions in Support of Defendant Election Systems & Software Inc.'s Motion for Partial Summary Judgment and Diebold Election Systems Suggestions in Support of Defendant Election Systems & Software Inc. Motion for Partial Summary Judgment of Invalidity of Certain Claims of the '944 Patent (with Exhibit), Avante International Technology Corporation*, Plaintiff, v. *Diebold Election Systems, et al*, Defendants; United States Easter District of Missouri Eastern Division: Cause No. 4:06-cv-00978 TCM, Aug. 1, 2007, 171 pages.
*Plaintiff's Opposition to Election Systems & Software Inc.'s Motion for Partial Summary Judgment of Invalidity of Certain Claims of the '944 Patent, Avante International Technology Corporation*, Plaintiff, v. *Diebold Election Systems, et al*, Defendants; United States Easter District of Missouri Eastern Division: Cause No. 4:06-cv-00978 TCM, Aug. 6, 2007, 204 pages.
*Memorandum and Order on Claim Construction, Avante International Technology Corporation*, Plaintiff, v. *Diebold Election Systems, et al*, Defendants; United States Easter District of Missouri Eastern Division: Cause No. 4:06-cv-00978 TCM, Aug. 20, 2007, 50 pages.

*Declaration of Peter G. Martin Filed in Support of Defendants' Joint Motion for Summary Judgment of Invalidity of the Asserted Claims from U.S. Patent Nos. 6,892,944 and 7,077,313 Under 35 U.S.C. §§102 and 103, Avante International Technology Corporation*, Plaintiff, v. *Premier Election Solutions, et al*, Defendants; United States Eastern District of Missouri Eastern Division: Case No. 4:06CV00978 TCM, Document 341, Nov. 2, 2007, 105 pages.
*Defendants' Memorandum in Opposition to Avante International Technology Corporation's Motion for Summary Judgment that U.S. Patent Nos. 6,892,944 and 7,077,313 Are Not Invalid in View of Defendants' References or 35 U.S.C. § 112 Arguments, Avante International Technology Corporation*, Plaintiff, v. *Premier Voting Solutions, Inc., et al*, Defendants; United Stated Eastern District of Missouri Eastern Division: Case No. 4:06CV00978 TCM, Document 394, Dec. 14, 2007, 199 pages.
*Defendant Premier Voting Solutions, Inc.'s Response to Statement of Uncontroverted Facts in Support of Avante International Technology Corporation's Motion for Summary Judgment that Premier Voting Solutions, Inc. Equipment Infringes U.S. Patent Nos. 6,892,944 and 7,077,313 and Additional Facts In Support of Its Opposition to Avante's Motion for Summary Judgement, Avante International Technology Corporation*, Plaintiff, v. *Premier Voting Solutions, Inc., et al*, Defendants; United States Eastern District of Missouri Eastern Division: Case No. 4:06CV00978 TCM, Document 399, Dec. 15, 2007, 197 pages.
*Defendants' Response to Avante International Technology Corporation's Statement of Material Facts In Support of Its Opposition to Defendants' Joint Motion for Summary Judgment That U.S. Patent Nos. 6,892,944 and 7,077,313 Are Invalid Under 35 U.S.C. §§ 102 and 103, Avante International Technology Corporation*, Plaintiff, v. *Premier Voting Solutions, et al*, Defendants; United States Eastern District of Missouri Eastern Division: Case No. 4:06CV00978 TCM, Document 430, Jan. 11, 2008, 68 pages.
*Defendants' Reply in Support of Their Joint Motion for Summary Judgment of Invalidity of the Asserted Claims From U.S. Patent Nos. 6,892,944 and 7,077,313 Are Invalid Under 35 U.S.C. §§ 102 and 103, Avante International Technology Corporation*, Plaintiff, v. *Premier Election Solutions, et al*, Defendants; United States Eastern District of Missouri Eastern Division: Case No. 4:06CV00978 TCM, Document 431, Jan. 11, 2008, 66 pages.
*Notice of Allowance of Patent Application No. 11/709,449 which has Bearing on Pending Summary Judgement Motions, Avante International Technology Corporation*, Plaintiff, v. *Premier Voting Solutions, et al*, Defendants; United States Eastern District of Missouri Eastern Division: Case No. 4:06CV00978 TCM, Document 467, Mar. 18, 2008, 4 pages.
*Defendants' Memorandum Regarding Plaintiff's Notice, Avante International Technology Corporation*, Plaintiff, v. *Premier Voting Solutions, et al*, Defendants; United States Eastern District of Missouri Eastern Division: Case No. 4:06CV00978 TCM, Document 469, Mar. 24, 2008, 6 pages.
*Avante's Response to Defendant's Memorandum, Avante International Technology Corporation*, Plaintiff, v. *Premier Voting Solutions, et al*, Defendants; United States Eastern District of Missouri Eastern Division: Case No. 4:06CV00978 TCM, Document 470, Mar. 26, 2008, 3 pages.
*Transcript of Jury Trial, vol. I, Avante International Technology Corporation*, Plaintiff, v. *Premier Election Solutions, et al*, Defendants; United States Eastern District of Missouri Eastern Division: Case No. 4:06-CV-978 TCM, Feb. 2, 2009, 111 pages.
*Defendants' Witness, Larry Hyer, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 2, 2009, 19 pages.
*Transcript of Jury Trial, vol. II-A, Avante International Technology Corporation*, Plaintiff, v. *Premier Election Solutions, et al*, Defendants; United States Eastern District of Missouri Eastern Division: Case No. 4:06-CV-978 TCM, Feb. 3, 2009, 112 pages.
*Transcript of Jury Trial, vol. II-B, Avante International Technology Corporation*, Plaintiff, v. *Premier Election Solutions, et al*, Defendants; United States Eastern District of Missouri Eastern Division: Case No. 4:06-CV-978 TCM, Feb. 3, 2009, 163 pages.
*Defendants' Witness, John Hanna, Transcript of Video Deposition Excerpts Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 3, 2009, 16 pages.
*Defendants' Witness, Brian Clubb, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 12 pages.
*Transcript of Jury Trial, vol. III-A, Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 127 pages.
*Transcript of Jury Trial, vol. III-B, Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 81 pages.
*Defendants' Witness, Frank Kaplan, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 21 pages.
*Defendants' Witness, Stephen Knecht, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 7 pages.
*Plaintiff's Witness, Kevin Chung, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 6 pages.
*Plaintiff's Witness, Brian Clubb, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 9 pages.
*Plaintiff's Witness, Timothy Cordes, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 3 pages.
*Plaintiff's Witness, Herman Deutsch, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 2 pages.
*Plaintiff's Witness, Luis Diaz, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 5 pages.
*Transcript of Jury Trial, vol. IV-A, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 102 pages.
*Transcript of Jury Trial, vol. IV-B, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 89 pages.
*Plaintiff's Witness, Mauro Rivero, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 3 pages.
*Plaintiff's Witness, Eric Wall, Transcript of Video Deposition Played to the Jury, Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 4 pages.
*Transcript of Jury Trial, vol. V-A, Avante International Technology Corporation*, Plaintiff, v. *Premier Election Solutions, et al*, Defendants; United States Eastern District of Missouri Eastern Division: Case No. 4:06-CV-978 TCM, Feb. 6, 2009, 115 pages.
*Transcript of Jury Trial, vol. V-B, Avante International Technology Corporation*, Plaintiff, v. *Premier Election Solutions, et al*, Defendants; United States Eastern District of Missouri Eastern Division: Case No. 4:06-CV-978 TCM, Feb. 6, 2009, 62 pages.
*Transcript of Jury Trial, vol. VI, Avante International Technology Corporation*, Plaintiff, v. *Premier Election Solutions, et al*, Defendants; United States Eastern District of Missouri Eastern Division: Case No. 4:06-CV-978 TCM, Feb. 9, 2009, 88 pages.
*Exhibit List, Avante International Technology Corporation*, Plaintiff, v. *Premier Election Solutions, et al*, Defendants; United States Eastern District of Missouri Eastern Division: Case No. 4:06-CV-978 TCM, Feb. 2009, 6 pages.
Plaintiff's Exhibit 9, Consulting Invoices, admitted Feb. 2009, 5 pages.
Plaintiff's Exhibit 18, Correspondence, admitted Feb. 2009, 2 pages.
Plaintiff's Exhibit 19, Correspondence, admitted Feb. 2009, 2 pages.
Plaintiff's Exhibit 23, Correspondence, admitted Feb. 2009, 4 pages.
Plaintiff's Exhibit 32, County of Sacramento, admitted Feb. 2009, 39 pages.
Plaintiff's Exhibit 37, Declaration, admitted Feb. 2009, 69 pages.
Plaintiff's Exhibit 68, Email from Lancaster, admitted Feb. 2009, 3 pages.
Plaintiff's Exhibit 70, Resignation Email, admitted Feb. 2009, 1 page.
Plaintiff's Exhibit 127, US Patent 5610383, admitted Feb. 2009, 9 pages.
Plaintiff's Exhibit 152, U.S. Appl. No. 10/260,167, admitted Feb. 2009, 192 pages.
Plaintiff's Exhibit 191, U.S. Appl. No. 60/326,265, admitted Feb. 2009, 84 pages.
Plaintiff's Exhibit 198, Video, admitted Feb. 2009 (copy being submitted separately via Express Mail).
Plaintiff's Exhibit 201, Letter to Ewald from Diebold, admitted Feb. 2009, 5 pages.
Plaintiff's Exhibit 202, Interrogatories, admitted Feb. 2009, 2 pages.
Plaintiff's Exhibit 203, Interrogatories, admitted Feb. 2009, 5 pages.
Defendant's Exhibit A, Chung Patent 6,892,944, admitted Feb. 2009, 22 pages.
Defendant's Exhibit A-3, Report of Sacramento Election, admitted Feb. 2009, 13 pages.
Defendant's Exhibit A-8, Provisional Application, admitted Feb. 2009, 84 pages.
Defendant's Exhibit A-9, Action Summary, admitted Feb. 2009, 7 pages.
Defendant's Exhibit B, Chung Patent 7,077,313, admitted Feb. 2009, 35 pages.
Defendant's Exhibit B-1, Tulare County Ballot, admitted Feb. 2009, 2pages.
Defendant's Exhibit B-9, Amendment, admitted Feb. 2009, 24 pages.
Defendant's Exhibit C, File History 6,892,944, admitted Feb. 2009, 210 pages.
Defendant's Exhibit D-2, Letter from State of Alabama, admitted Feb. 2009, 2 pages.
Defendant's Exhibit D-4, Slipedit Program User Manual, admitted Feb. 2009, 7 pages.
Defendant's Exhibit E, File History 7,077,313, admitted Feb. 2009, 346 pages.
Defendant's Exhibit E-2, GEMS User Guide, admitted Feb. 2009, 41 pages.
Defendant's Exhibit E-4, Specification for Slipedit Editor, admitted Feb. 2009, 11 pages.
Defendant's Exhibit F-3, Letter from California, admitted Feb. 2009, 1 pages.
Defendant's Exhibit F-4, Specification of Pagescan II, admitted Feb. 2009, 42 pages.
Defendant's Exhibit F-7, Supplemental Declaration, admitted Feb. 2009, 2 pages.
Defendant's Exhibit F-8, Declaration of Clubb, admitted Feb. 2009, 66 pages.
Defendant's Exhibit G, McMillan Patent 4,300,123, admitted Feb. 2009, 14 pages.
Defendant's Exhibit G-4, PA Assoc. Marketing Strategy, admitted Feb. 2009, 26 pages.
Defendant's Exhibit G-7, Work Order, admitted Feb. 2009, 1 pages.
Defendant's Exhibit G-8, Action Summary, admitted Feb. 2009, 6 pages.
Defendant's Exhibit G-9, Declaration of Childers, admitted Feb. 2009, 28 pages.
Defendant's Exhibit H, Patent 5,103,490, admitted Feb. 2009, 14 pages.
Defendant's Exhibit H-1, Test Report from Wyle, admitted Feb. 2009, 265 pages.
Defendant's Exhibit H-2, Data Sheet for Vision Series 8000, admitted Feb. 2009, 2 pages.
Defendant's Exhibit H-4, Pagescan 280 Fact Sheet, admitted Feb. 2009, 2 pages.
Defendant's Exhibit H-7, Equipment Order, admitted Feb. 2009, 1 pages.
Defendant's Exhibit H-8, Response to Action Summary, admitted Feb. 2009, 43 pages.
Defendant's Exhibit I, Patent No. 5,134,669, admitted Feb. 2009, 16 pages.
Defendant's Exhibit I-1, Wyle Leter, admitted Feb. 2009, 26 pages.
Defendant's Exhibit I-4, Letter from Hanna to Chung, admitted Feb. 2009, 2 pages.
Defendant's Exhibit I-9, Email from Martin to Global, admitted Feb. 2009, 2 pages.
Defendant's Exhibit J, Patent No. 5,248,872, admitted Feb. 2009, 13 pages.
Defendant's Exhibit K, Patent No. 6,250,548, admitted Feb. 2009, 54 pages.
Defendant's Exhibit K-1, Ballot Production Handbook, admitted Feb. 2009, 50 pages.
Defendant's Exhibit K-3, GEMS FEC Compliance Overview, admitted Feb. 2009, 107 pages.
Defendant's Exhibit K-8, Duty of Disclosure, admitted Feb. 2009, 14 pages.
Defendant's Exhibit K-11, San Diego County Contract, admitted Feb. 2009, 209 pages.
Defendant's Exhibit L-1, Model 100 Hardware Specification, admitted Feb. 2009, 106 pages.
Defendant's Exhibit L-2, GEMS System Software Specifications, admitted Feb. 2009, 154 pg.
Defendant's Exhibit L-3, Global Certification Compliance Summary, admitted Feb. 2009, 13 pgs.
Defendant's Exhibit L-7, Developer's Guide, admitted Feb. 2009, 125 pages.
Defendant's Exhibit M-1, Model 100 Software Specification, admitted Feb. 2009, 110 pages.
Defendant's Exhibit M-2, Email from Knecht, admitted Feb. 2009, 2 pages.
Defendant's Exhibit M-3, Product Proposal by Martin, admitted Feb. 2009, 24 pages.
Defendant's Exhibit M-8, Action Summary, admitted Feb. 2009, 8 pages.
Defendant's Exhibit N-2, Video of Highspeed Central Count, admitted Feb. 2009, 1 pages.
Defendant's Exhibit N-3, Review of Sacramento Election, admitted Feb. 2009, 8 pages.
Defendant's Exhibit N-8, Response to Action Summary, admitted Feb. 2009, 20 pages.
Defendant's Exhibit O-2, Software Source Code, admitted Feb. 2009, 11 pages.
Defendant's Exhibit O-3, User Manual for Scanner, admitted Feb. 2009, 68 pages.
Defendant's Exhibit O-6, Video Demo of AccuVote, admitted Feb. 2009, 1 pages.
Defendant's Exhibit O-8, Notice of Allowance, admitted Feb. 2009, 5 pages.
Defendant's Exhibit P-3, Listing of Time Tracking for Martin, admitted Feb. 2009, 11 pages.
Defendant's Exhibit R-9, Sacramento Ballot, admitted Feb. 2009, 3 pages.

Defendant's Exhibit R-11, Contract Report Sep. 27, 2001, admitted Feb. 2009, 2 pages.
Defendant's Exhibit T-3, Memorandum from Meehan, admitted Feb. 2009, 2 pages.
Defendant's Exhibit T-4, Cummings Patent Application, admitted Feb. 2009, 36 pages.
Defendant's Exhibit T-11, Email from Lancaster to Martin, admitted Feb. 2009, 1 pages.
Defendant's Exhibit U-1, Invoice for Dallas Co. TX, admitted Feb. 2009, 3 pages.
Defendant's Exhibit U-3, Memo from Dobson, admitted Feb. 2009, 2 pages.
Defendant's Exhibit U-4, Cummings Patent Application, admitted Feb. 2009, 29 pages.
Defendant's Exhibit U-11, Peripheral Dynamics Letter, admitted Feb. 2009, 12 pages.
Defendant's Exhibit V-2, Memo from Dean to Ensiminger, admitted Feb. 2009, 3 pages.
Defendant's Exhibit V-3, Manufacturing Request, admitted Feb. 2009, 5 pages.
Defendant's Exhibit V-11, Peripheral Dynamics Email, admitted Feb. 2009, 4 pages.
Defendant's Exhibit W-3, Peripheral Dynamics Invoice, admitted Feb. 2009, 2 pages.
Defendant's Exhibit W-5, Patent No. 4,813,708, admitted Feb. 2009, 8 pages.
Defendant's Exhibit W-11 Sample Ballot, admitted Feb. 2009, 6 pages.
Defendant's Exhibit X-2, Proposal from Global to Sacramento, admitted Feb. 2009, 9 pages.
Defendant's Exhibit X-3, Specifications for PageScan II, admitted Feb. 2009, 52 pages.
Defendant's Exhibit X-11, Dr. Singh's Invoices, admitted Feb. 2009, 29 pages.
Defendant's Exhibit Y-7, Cummings Patent Application, admitted Feb. 2009, 32 pages.
Defendant's Exhibit Y-11, Small Binder of PDI, admitted Feb. 2009, 71 pages.
Defendant's Exhibit Z-2, Email from Martin, admitted Feb. 2009, 4 pages.
Defendant's Exhibit Z-3, PageScan User Manual, admitted Feb. 2009, 7 pages.
Defendant's Exhibit Z-7, Cummings Patent Application, admitted Feb. 2009, 12 pages.
*Order, Findings, and Conclusions on Inequitable Conduct, Avante International Technology Corporation*, Plaintiff, v. *Premier Election Solutions, et al*, Defendants; United States Eastern District of Missouri Eastern Division: Case No. 4:06-CV-0978 TCM, Document 649, Mar. 17, 2009, 14 pages.
*Order, Findings, and Conclusions on the Obviousness of the '944 and '313 Patents, Avante International Technology Corporation*, Plaintiff, v. *Premier Election Solutions, et al*, Defendants; United States Eastern District of Missouri Eastern Division: Case No. 4:06-CV-0978 TCM, Document 650, Mar. 17, 2009, 6 pages.
*Judgment, Avante International Technology Corporation*, Plaintiff, v. *Premier Election Solutions, et al*, Defendants; United States Eastern District of Missouri Eastern Division: Case No. 4:06-CV-0978 TCM, Document 651, Mar. 17, 2009, 2 pages.
*Supplemental Report of Defendant's Expert Michael I. Shamos, Ph.D., J.D. Concerning Invalidity, Avante International Technology Corporation*, Plaintiff, v. *Premier Election Solutions, et al*, Defendants; United States Eastern District of Missouri Eastern Division: Case No. 4:06CV00978 TCM, Nov. 6, 2008, 8 pages.
*Exhibit 4 to Defendants' Expert Report on Invalidity, Invalidity Analysis of Chung et al. '944 and '313, Avante International Technology Corporation*, Plaintiff, v. *Premier Election Solutions, et al*, Defendants; United States Eastern District of Missouri Eastern Division: Case No. 4:06CV00978 TCM, Nov. 6, 2008, 6 pages.
American Information Systems, Inc., AIS Model 150 Central Ballot Scanner Operator's Manual Version 5.6.1.7, © 1997, Apr. 1997, 64 pages.
Peripheral Dynamics, Inc., "Manufacturing Request", Oct. 3, 2001, 1 page.
Peripheral Dynamics, Inc., "Specification No. 3-1308-7071D for Peripheral Dynamics, Inc., Pagescan II Full-Page Image Scanner", Sep. 6, 2000, 52 pages.
Peripheral Dynamics, Inc., "SlipEdit User Manual No. 3-1305-7034B", Undated, 5 pages.
*Written Report of John D. Bakker, Avante International Technology Corporation*, Plaintiff, v. *Premier Election Solutions, et al*, Defendants; United States Eastern District of Missouri Eastern Division: Case No. 4:06CV00978 TCM, Sep. 5, 2008, 8 pages.
*Report of J. Michael Thesz, Pursuant to Rule 26, Federal Rules of Civil Procedure, Avante International Technology Corporation*, Plaintiff, v. *Premier Election Solutions, et al*, Defendants; United States Eastern District of Missouri Eastern Division: Case No. 4:06CV00978 TCM, Sep. 9, 2008, 48 pages.
*Report of Peter G. Martin, Avante International Technology Corporation*, Plaintiff, v. *Premier Election Solutions et al*, Defendants; United States Eastern District of Missouri Eastern Division: Case No. 4:06CV00978 TCM, Sep. 9, 2008, 35 pages.
*Report of Defendants' Expert Michael Ian Shamos, Ph.D., J.D. Concerning Inequitable Conduct, Avante International Technology Corporation*, Plaintiff, v. *Premier Election Solutions, et al*, Defendants; United States Eastern District of Missouri Eastern Division: Case No. 4:06CV00978 TCM, Sep. 9, 2008, 15 pages.
*Report of Defendants' Expert Michael Ian Shamos, Ph.D., J.D. Concerning Invalidity, Avante International Technology Corporation*, Plaintiff, v. *Premier Election Solutions, et al*, Defendants; United States Eastern District of Missouri Eastern Division: Case No. 4:06CV00978 TCM, Sep. 9, 2008, 53 pages.
*Premier Election Solutions, Inc.'s Supplemental Responses Avante's Interrogatories, Avante International Technology Corporation*, Plaintiff, v. *Premier Election Solutions, et al*, Defendants; United States Eastern District of Missouri Eastern Division: Case No. 4:06CV00978 TCM, Sep. 11, 2008, 9 pages.
*Supplemental Responses to Interrogatory Nos. 1, 2, 3, 4 and 20 from Plaintiff's Interrogatories to Defendant Election Systems and Software, Avante International Technology Corporation*, Plaintiff, v. *Premier Election Solutions, et al*, Defendants; United States Eastern District of Missouri Eastern Division: Case No. 4:06CV00978 TCM, Sep. 17, 2008, 9 pages.
*Plaintiff Election Systems & Software, Inc.'s Answers to Defendant's First Set of Interrogatories to Plaintiff, Election Systems & Software, Inc.*, Plaintiff, v. *Avante International Technology Corporation*, Defendant; United States Eastern District of Missouri Eastern Division: Case No. 4:08-CV-695-TCM, Sep. 22, 2008, 46 pages.
*Premier Election Solutions, Inc.'s Response to Plaintiff's Fourth Set of Interrogatories, Avante International Technology Corporation*, Plaintiff, v. *Premier Election Solutions, et al*, Defendants; United States Eastern District of Missouri Eastern Division: Case No. 4:06CV00978 TCM, Jul. 15, 2008, 16 pages.
*Response to Plaintiff's Fifth Set of Interrogatories to Defendant Election Systems and Software, Avante International Technology Corporation*, Plaintiff, v. *Premier Election Solutions, et al*, Defendants; United States Eastern District of Missouri Eastern Division: Case No. 4:06CV00978 TCM, Jul. 15, 2008, 15 pages.
*Sequoia Voting Systems' Objections and Response to Plaintiff's Sixth Set of Interrogatories, Avante International Technology Corporation*, Plaintiff, v. *Premier Election Solutions, et al*, Defendants; United States Eastern District of Missouri Eastern Division: Case No. 4:06CV00978 TCM, Jul. 15, 2008, 10 pages.
*Memorandum and Order, Avante International Technology Corporation*, Plaintiff, v. *Premier Election Solutions, et al*, Defendants; United States Eastern District of Missouri Eastern Division: Case No. 4:06CV00978 TCM, Document 486, Jul. 16, 2008, 33 pages.
*Defendant's Supplemental Responses and Objections to Plaintiff's First Requests for Admission, Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 102, Jun. 4, 2008, 6 pgs.
*Defendant's Supplemental Responses to Plaintiff's First Set of Interrogatories, Avante International Technology, Inc.*, Plaintiff, v. *Hart Intercivic, Inc.*, Defendant; United States Southern District of Illinois East St. Louis Division: Case No. 3:07-cv-00169-DRH-CJP, Jun. 4, 2008, 88 pgs.

*Defendant Hart Intercivic, Inc.'s Preliminary Invalidity Contentions for U.S. Patent Nos. 6,892,944, 7,036,730, and 7,077,313, Avante International Technology Corporation*, Plaintiff and Counter-Defendant, v. *Hart Intercivic, Inc.*, Defendant and Counter-Plaintiff; United States Southern District of Illinois East St. Louis Division: Case No. 3:07-cv-00169-DRH-CJP, Sep. 10, 2007, 49 pages.

*Content Listing of Hart Intercivic's Invalidity Contentions, Exhibit F (disk), Avante International Technology Corporation*, Plaintiff and Counter-Defendant, v. *Hart Intercivic, Inc.*, Defendant and Counter-Plaintiff; United States Southern District of Illinois East St. Louis Division: Case No. 3:07-cv-00169-DRH-CJP, Sep. 10, 2007, 3 pages.

Ramin Safarl-Foroushani, "Form Registration: A Computer Vision Approach", © 1997, 121 pages.

Ashraf Nasr Sayed, "Extraction and Photogrammetric Exploitation of Features in Digital Images", Aug. 1990, 263 pages.

Scientific Translation Services, "*Novel Voting Process and Means for Carrying Out Same*," [EPO 0 419 335 A1] English Translation of col. 1-10, (Translated May 2004), 8 pages.

Benaloh J et al, "Receipt-Free Secret-Ballot Elections (Extended Abstract)," Proceedings of the Annual ACM Symposium on the Theory of Computing, XX, XX, 1994, pp. 544-551, XP002099996.

*Sequoia Voting Systems' Updated Invalidity Contentions, Avante International Technology Corporation*, Plaintiff, v. *Premier Election Solutions, et al*, Defendants; United States Eastern District of Missouri Eastern Division: Case No. 4:06-cv-00978 TCM, Oct. 22, 2007, 42 pages.

*Premier Election Solution, Inc.'s Invalidity Contentions for the '944 and '313 Patents, Avante International Technology Corporation*, Plaintiff, v. *Premier Election Solutions, et al*, Defendants; United States Eastern District of Missouri Eastern Division: Case No. 4:06-cv-00978 TCM, Oct. 23, 2007, 39 pages.

*Defendant Election Systems & Software, Inc.'s Updated Invalidity Contentions, Avante International Technology Corporation*, Plaintiff, v. *Premier Election Solutions, et al*, Defendants; United States Eastern District of Missouri Eastern Division: Case No. 4:06-cv-00978 TCM, Oct. 22, 2007, 32 pages.

*Defendant's Premier Election Solutions, Inc. and Election Systems & Software, Inc.'s Memorandum of Law in Support of its Motion for Summary Judgement of Non-Infringement on Claims 26-28, 30 and 49-51 of U.S. Patent No. 6,892,944, Avante International Technology Corporation*, Plaintiff, v. *Premier Election Solutions, et al*, Defendants; United States Eastern District of Missouri Eastern Division: Case No. 4:06-cv-00978 TCM, Document 334, Nov. 2, 2007, 14 pages.

*Memorandum in Support of Defendants' Joint Motion for Summary Judgement of Invalidity of Claims 26-28, 30 and 49-51 of U.S. Patent No. 6,892,944, Avante International Technology Corporation*, Plaintiff, v. *Premier Election Solutions, et al*, Defendants; United States Eastern District of Missouri Eastern Division: Case No. 4:06-cv-00978 TCM, Document 337, Nov. 2, 2007, 20 pages.

*Memorandum in Support of Defendants' Joint Motion for Summary Judgement of Invalidity of the Asserted Claims from U.S. Patent Nos. 6,892,944 and 7,077,313 Under 35 U.S.C. §§ 102 and 103, Avante International Technology Corporation*, Plaintiff, v. *Premier Election Solutions, et al*, Defendants; United States Eastern District of Missouri Eastern Division: Canuse No. 4:06-cv-00978 TCM, Document 339, Nov. 2, 2007, 26 pages.

*Statement of Uncontroverted Material Facts in Support of Defendants' Joint Motion for Summary Judgment that U.S. Patent Nos. 6,892,944 and 7,077,313 Are Invalid Under 35 U.S.C. §§ 102 and 103, Avante International Technology Corporation*, Plaintiff, v. *Premier Election Solutions, et al*, Defendants; United States Eastern District of Missouri Eastern Division: Case No. 4:06-cv-00978 TCM, Document 340, Nov. 2, 2007, 192 pages.

Roy G. Saltman, "Effective Use of Computing Technology in Vote-Tallying", Mar. 1975, 139 pgs.

Douglas Jones, "A Brief Illustrated History of Voting", 2001, 18 pages.

North American Professional Technologies, "Vote Tally System Ballot Production Guide", Jun. 1989, 16 pages.

Michael I. Shamos, "American Information Systems, AIS 115 and 315 Vote Tabulation Systems, An Evaluation", Dec. 1989, 9 pages.

Michael I. Shamos, "American Information Systems, AIS 150 and 550 Mark-Sense Vote Tabulation Systems and Election Reporting System (ERS), An Evaluation", Mar. 1994, 5 pages.

Michael I. Shamos, "Business Records Corporation, Optech IV-C Model 200 Mark-Sense Central Tabulation Unit, An Evaluation", Nov. 1991, 8 pages.

Michael I. Shamos, "American Information Systems, AIS 315 Ballot Counter, An Evaluation", Nov. 1983, 5 pages.

Michael I. Shamos, "The Sequoia Pacific Datavote System, An Evaluation", Jun. 1984, 7 pages.

*Statement of Uncontroverted Material Facts in Support of Defendants' Election Systems and Software Inc. and Premier Election Solutions, Inc.'s Motion for Summary Judgment of Non-Infringement of Claims 26-28, 30 and 49-51 of U.S. Patent 6,892,944, Avante International Technology Corporation*, Plaintiff, v. *Premier Election Solutions, et al*, Defendants; United States Eastern District of Missouri Eastern Division: Case No. 4:06CV00978 TCM, Document 333, Nov. 2, 2007, 29 pages.

*Statement of Uncontroverted Material Facts in Support of Defendants' Joint Motion for Summary Judgment of Invalidity of Claims 26-28, 30 and 49-51 of U.S. Patent No. 6,892,944, Avante International Technology Corporation*, Plaintiff, v. *Premier Election Solutions, et al*, Defendants; United States Eastern District of Missouri Eastern Division: Case No. 4:06CV00978 TCM, Document 336, Nov. 2, 2007, 95 pages.

*Motion for Summary Judgment of Invalidity of the Asserted Claims from U.S. Patent Nos. 6,892,944, and 7,077,313 Under 35 U.S.C. §§ 102 and 103, Avante International Technology Corporation*, Plaintiff, v. *Premier Election Solutions, et al*, Defendants; United States Eastern District of Missouri Eastern Division: Case No. 4:06CV00978 TCM, Document 338, Nov. 2, 2007, 3 pages.

*Declaration of Michael I. Shamos, Ph.D., J.D. in Support of Defendants' Joint Motion for Summary Judgment that U.S. Patent Nos. 6,892,944, and 7,077,313 are Invalid Under 35 U.S.C. §§ 102(b) and 103(a), Avante International Technology Corporation*, Plaintiff, v. *Premier Election Solutions, et al*, Defendants; United States Eastern District of Missouri Eastern Division: Case No. 4:06CV00978 TCM, Document 342, Nov. 2, 2007, 332 pages.

*Plaintiff Avante International Technology, Corporation's Memorandum in Opposition to Defendants' Joint Motion for Summary Judgment of Invalidity of Claims 26-28, 30 and 49-51 of U.S. Patent No. 6,892,944, Avante International Technology Corporation*, Plaintiff, v. *Premier Election Solutions, et al*, Defendants; United States Eastern District of Missouri Eastern Division: Case No. 4:06CV00978 TCM, Document 388, Dec. 14, 2007, 180 pages.

*Defendants' Response to Plaintiff Avante International Technology Corporation's Statement of Uncontroverted Facts in Support of its Motion for Summary Judgment that U.S. Patent Nos. 6,892,944 and 7,077,313 are not Invalid, in View of Defendants' References or 35 U.S.C. § 112 Arguments, Avante International Technology Corporation*, Plaintiff, v. *Premier Election Solutions, et al*, Defendants; United States Eastern District of Missouri Eastern Division: Case No. 4:06CV00978 TCM, Document 395, Dec. 14, 2007, 90 pages.

*Premier Voting Solutions, Inc.'s Memorandum in Opposition to Avante International Technology Corporation's Motion for Summary Judgment that Premier Election Solutions, Inc.'s Equipment Infringes U.S. Patent Nos. 6,892,944 and 7,077,313, Avante International Technology Corporation*, Plaintiff, v. *Premier Election Solutions, et al*, Defendants; United States Eastern District of Missouri Eastern Division: Case No. 4:06CV00978 TCM, Document 396, Dec. 14, 2007, 10 pages.

*Sequoia Voting Systems' Opposition to Plaintiff's Motion for Summary Judgment that Sequoia's Equipment Infringes U.S. Patent Nos. 6,892,944 and 7,077,313, Avante International Technology Corporation*, Plaintiff, v. *Premier Election Solutions, et al*, Defendants; United States Eastern District of Missouri Eastern Division: Case No. 4:06CV00978 TCM, Document 417, Jan. 9, 2008, 151 pg.

*Avante International Technology Corporation's Reply in Support of its Motion for Summary Judgment that Diebold Election Systems, Inc.'s Equipment Infringes U.S. Patent Nos. 6,892,944 and 7,077,313, Avante International Technology Corporation*, Plaintiff, vs. *Premier Election Solutions, et al*, Defendants; United States Eastern District of Missouri Eastern Division: Case No. 4:06CV00978 TCM, Document 425, Jan. 11, 2008, 14 pages.
*Defendants' Reply in Support of Their Joint Motion for Summary Judgment of Invalidity of Claims 26-28, 30 and 49-51 of U.S. Patent No. 6,892,944 Based on 35 U.S.C. §112 ¶ 1, Avante International Technology Corporation*, Plaintiff, v. *Premier Election Solutions, et al*, Defendants; United States Eastern District of Missouri Eastern Division: Case No. 4:06CV00978 TCM, Document 428, Jan. 11, 2008, 101 pages.
*Defendants Premier Election Solutions, Inc. and Election Systems & Software, Inc.'s Reply in Support of Their Motion for Summary Judgment of Non-Infringement of Claims 26-28, 30 and 49-51 of U.S. Patent No. 6,892,944, Avante International Technology Corporation*, Plaintiff, v. *Premier Election Solutions, et al*, Defendants; United States Eastern District of Missouri Eastern Division: Case No. 4:06CV00978 TCM, Document 429, Jan. 11, 2008, 17 pages.
Michael I. Shamos, "Shoup Corporation, Shouptronic Direct Recording Electronic Voting System, An Evaluation", Jul. 1991, 3 pages.
*Defendant Hart Intercivic, Inc.'s Response to Plaintiff's Claim Construction Brief for U.S. Patent Nos. 6,892,944, 7,036,730 and 7,077,313, Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 58, Feb. 1, 2008, 304 pgs.
*Avante International Technology, Inc.'s Reply in Support of its Claim Construction Brief for U.S. Patent No. 7,036,730, U.S. Patent No. 6,892,944, and U.S. Patent No. 7,077,313, Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 60, Feb. 8, 2008, 71 pgs.
*Avante International Technology, Inc.'s Claim Construction Brief for U.S. Patent No. 7,036,730, U.S. Patent No. 6,892,944, and U.S. Patent No. 7,077,313, Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 57, Jan. 18, 2008, 364 pgs.
Internet Archive Wayback Machine, VoteHere.net, The Secure Internet Voting Company, http://web.archive.org/web/*/http//votehere, pp. HL00068-HL00092, allegedly Oct. 19, 2000, printed May 8, 2007.
Avante International Technology, Inc., "Optical VOTE-TRAKKER™: A "Mark-Sense" Absentee & Precinct Based Voting System that Minimizes Both Voter and System Errors", link available at http://www.vote-trakker.com/optical.html, Jan. 2004, 10 pages.
Avante International Technology, Inc., "Avante Optical VOTE-TRAKKER™", © 2001-2004, 2 pages, printed Jun. 11, 2007.
Avante International Technology, Inc., "Avante VOTE-TRAKKER™"and "Avante VOTE-TRAKKER™ Overview", Mar. 16, 2004, 6 pages, printed Jun. 11, 2007.
Avante International Technology, Inc., "Avante VOTE-TRAKKER™ EVC308-SPR"and "Avante VOTE-TRAKKER™ EVC308-SPR-FF", © 2001-2004, 6 pages, printed.
Avante International Technology, Inc., "Accessible Voting Integrating the Touch-Screen Accessibility of DRE System with the Optical Scanning Paper Ballots", © 2001-2004, certain parts updated Mar. 16, 2004, Apr. 8, 2004 and May 18, 2004, 17 pages, printed Jun. 11, 2007.
Federal Election Commission, "Voting Systems Performance and Test Standards" Overview and vols. I & II, 2002, 307 pages.
Federal Election Commission, "Performance and Test Standards for Punchcard, Marksense, and Direct Recording Electronic Voting Systems" Jan. 1990, 204 Pages.
*Avante International Technology Corporation* v. *Diebold Election Systems, et al.*, Case No. 4:06CV00978, "Defendant Election Systems & Software, Inc.'s Preliminary Invalidity Contentions for U.S. Patent No. 7,077,313", Mar. 2, 2007, 22 Pages.
*Avante International Technology Corporation* v. *Diebold Election Systems, et al.*, Case No. 4:06CV00978, "Sequoia Voting System's Preliminary Invalidity Contentions for U.S. Patent No. 7,077,313", Mar. 2, 2007, 34 Pages.
*Avante International Technology Corporation* v. *Diebold Election Systems, et al.*, Case No. 4:06CV00978, "Diebold Election Systems, Inc.'s Invalidity Contentions for the '313 Patent", Mar. 5, 2007, 26 Pages.
Frontline Solutions, "RFID Standards Buoy Packaging," Jul. 2001, 3-Pages.
Frontline Solutions, "Packagers Think Outside The Box," May 2001, 3 Pages.
Frontline Solutions, "RFID Baggage Tracking Solution Helps Keep SFIA Secure," Jul. 2001, 4 Pages.
Frontline Solutions, "Standard Response," Jul. 2001, 1 Page.
Avante International Technology, Inc., "How Does LEDS-TRAKKER Work to Enhance the Values for Exhibitors and Vistors?," 2002, 3 Pages.
LEADS-TRAKKER Web Pages, http://www.leads-trakker.com/ Printed Nov. 18, 2002, 18 Pages.
International Search Report, PCT/US01/42563, Sep. 18, 2002, 5 Pages.
Terry Costlow, "Computer Kiosk Expedites Voter Registration," IEEE Spectrum, Oct. 2002, 2 Pages.
AccuVote-TS, http://www.gesn.com/AccuVote-TS/accuvote-ts.html, Global Election Systems, Inc., 4 Pages, prior to May 12, 2006.
NEDAP, "Voting System," c 2000, 4 Pages.
Hart Interactive, "eSlate Electronic Voting System," http://www.worldwideelection.com/GoveSlate.cfm, 1998-2000, 2 Pages.
Alan Dechert, "The Voter Certified Ballot," Granite Bay, CA., http://www.go2zero.com/voterform.html, Feb. 13, 2001, 15 Pages.
Robert Wright, "Recasting the Voting Process," www.varbusiness.com, Mar. 5, 2001, 4 Pages.
Michael Stanton, "The Importance of Recounting Votes," http://www.notablesoftware.com/Press/electronic_voting_in_brasil.htm, Nov. 13, 2000, 3 Pages.
Bruce Schneier, "Voting and Technology," Crypto-Gram, http://www.notablesoftware.com/Press/Schneier.html, Dec. 15, 2000, 3 Pages.
Avante International Technology, Inc., "Optical Vote-Trakker. A "Mark-Sense" Absentee & Precinct-Based Voting System That Minimizes Both Voter and System Errors," Jan. 2004, 7 Pages.
Avante, "Auamte VOTE-TRAKKER EVC308-SPR," http://www.aitechnology.com/votetrakker2/evc308spr.html, Printed Nov. 11, 2004, 3 Pages.
Avante, "Avante VOTE-TRAKKER Overview," http://www.aitechnology.com/vottrakker2/overview.html, Printed Nov. 11, 2004, 9 Pages.
Avante, Avante VOTE-TRAKKER EVC308-SPR-FF, "Full-Face Touch-Screen Voting System," http://www.aitecthnology.com/votetrakker2/evc308sprff.html, Printed Nov. 11, 2004, 6 Pages.
Avante, Avante Optical VOTE-TRAKKER, "Pixel-Based Optical Mark-Sense Paper System Certified to 2002 FEC Voting Standard," http://www.aitechnology.com/votetrakker2/optical.html, Printed Nov. 11, 2004, 12 Pages.
Plaintiffs Exhibit 198, Video, admitted Feb. 2009.
*Written Offer of Proof, Avante International Technology Corporation*, Plaintiff, v. *Premier Election Solutions, et al*, Defendants; United States Eastern District of Missouri Eastern Division: Case No. 4:06-CV-978 TCM, Document 613, Feb. 9, 2009, 4 pages.
*Defendants' Proposed Findings of Fact and Conclusions of Law Re Inequitable Conduct in the Prosecution of the '313 and '944 Patents, Avante International Technology Corporation*, Plaintiff, v. *Premier Election Solutions, et al*, Defendants; United States Eastern District of Missouri Eastern Division: Case No. 4:06-CV-978 TCM, Document 615, Feb. 11, 2009, 12 pages.
*Plaintiff Avante International Technology Corp.'s Proposed Findings of Fact and Conclusions of Law That There Was No Inequitable Conduct, Avante International Technology Corporation*, Plaintiff, v. *Premier Election Solutions, et al*, Defendants; United States Eastern District of Missouri Eastern Division: Case No. 4:06-CV-978 TCM, Document 616, Feb. 11, 2009, 3 pages.
*Plaintiff's Proposed Findings of Fact and Conclusions of Law That There Was No Inequitable Conduct, Avante International Technology Corporation*, Plaintiff, v. *Premier Election Solutions, et al*, Defendants; United States Eastern District of Missouri Eastern Division: Case No. 4:06-CV-978 TCM, Document 616-2, Feb. 11, 2009, 13 pages.
*Plaintiff's Combined Post-Trial Motion and Memorandum for Judgment as a Matter of Law, or, in the Alternative, for a New Trial, Avante International Technology Corporation*, Plaintiff, v. *Premier Election Solutions, et al*, Defendants; United States Eastern District of Missouri Eastern Division: Case No. 4:06-CV-978 TCM, Document 642, Feb. 24, 2009, 23 pages.
*Plaintiff's Unopposed Motion to Withdraw Plaintiff's Combined Post-Trial Motion and Memorandum for Judgment as a Matter of Law, or in the Alternative, for a New Trial, Avante International Technology Corporation*, Plaintiff, v. *Premier Election Solutions, et al*, Defendants; United States Eastern District of Missouri Eastern Division: Case No. 4:06-CV-978 TCM, Document 644, Feb. 26, 2009, 3 pages.
*Defendants' Renewed Motion for Judgment as a Matter of Law or, in the Alternative*, for a New Trial that the '944 and '323 Patents are Unenforceable, *Avante International Technology Corporation*, Plaintiff, v. *Premier Election Solutions, et al*, Defendants; United States Eastern District of Missouri Eastern Division: Case No. 4:06-CV-978 TCM, Document 661, Mar. 31, 2009, 2 pages.
*Memorandum in Support of Defendants' Renewed Motion for Judgment as a Matter of Law or, in the Alternative, for a New Trial That the '944 and '313 Patents are Unenforceable, Avante International Technology Corporation*Plaintiff, v. *Premier Election Solutions, et al*, Defendants; United States Eastern District of Missouri Eastern Division: Case No. 4:06-CV-978 TCM, Document 662, Mar. 31, 2009, 14 pages.
*Exhibit A, Transcript of Videotaped Deposition of Larry Hyer, Avante International Technology Corporation*, Plaintiff, v. *Premier Election Solutions, et al*, Defendants; United States Eastern District of Missouri Eastern Division: Case No. 4:06-CV-978 TCM, Document 662-2, Mar. 31, 2009, 4 pages.
*Exhibit B, Transcript of Videotaped Deposition of John W. Hanna, Avante International Technology Corporation*, Plaintiff, v. *Premier Election Solutions, et al*, Defendants; United States Eastern District of Missouri Eastern Division: Case No. 4:06-CV-978 TCM, Document 662-3, Mar. 31, 2009, 4 pages.
*Defendants' Motion for a Finding that the Case is Exceptional Under 35 U.S.C. § 285 and for Attorney Fees on Multiple Grounds, Avante International Technology Corporation*, Plaintiff, v. *Premier Election Solutions, et al*, Defendants; United States Eastern District of Missouri Eastern Division: Case No. 4:06-CV-978 TCM, Document 664, Apr. 6, 2009, 3 pages.
*Defendants' Memorandum in Support of Their Motion for a Finding that the Case is Exceptional Under 35 U.S.C. § 285 and for Attorney Fees on Multiple Grounds, Avante International Technology Corporation*, Plaintiff, v. *Premier Election Solutions, et al*, Defendants; United States Eastern District of Missouri Eastern Division: Case No. 4:06-CV-978 TCM, Document 665, Apr. 6, 2009, 15 pages.
*Exhibit 1, Letter of James A. Oliff, Feb. 9, 2007, Avante International Technology Corporation*, Plaintiff, v. *Premier Election Solutions, et al*, Defendants; United States Eastern District of Missouri Eastern Division: Case No. 4:06-CV-978 TCM, Document 665-2, Apr. 6, 2009, 5 pages.
*Exhibit 2 Transcript of Videotaped Deposition of Steve Bolton, Avante International Technology Corporation*, Plaintiff, v. *Premier Election Solutions, et al*, Defendants; United States Eastern District of Missouri Eastern Division: Case No. 4:06-CV-978 TCM, Document 665-3, Apr. 6, 2009, 49 pages.
*Exhibit 3, Transcript of Videotaped Deposition of Peter Martin, Avante International Technology Corporation*, Plaintiff, v. *Premier Election Solutions, et al*, Defendants; United States Eastern District of Missouri Eastern Division: Case No. 4:06-CV-978 TCM, Document 665-4, Apr. 6, 2009, 37 pages.
*Exhibit 4, Defendant Premier's Requests for Admission to Plaintiff, Avante International Technology Corporation*, Plaintiff, v. *Premier Election Solutions, et al*, Defendants; United States Eastern District of Missouri Eastern Division: Case No. 4:06-CV-978 TCM, Document 665-5, Apr. 6, 2009, 7 pages.
*Motion for Bill of Costs by Counter Claimaint Sequoia, Avante International Technology Corporation*, Plaintiff, v. *Premier Election Solutions, et al*, Defendants; United States Eastern District of Missouri Eastern Division: Case No. 4:06-CV-978 TCM, Document 666, Apr. 6, 2009, 2 pages.
*Motion for Bill of Costs by Premier Election Solutions, Inc., Avante International Technology Corporation*, Plaintiff, v. *Premier Election Solutions, et al*, Defendants; United States Eastern District of Missouri Eastern Division: Case No. 4:06-CV-978 TCM, Document 667, Apr. 6, 2009, 2 pages.
*Defendants' Joint Memorandum in Support of Defendant's Bill of Costs, Avante International Technology Corporation*, Plaintiff, v. *Premier Election Solutions, et al*, Defendants; United States Eastern District of Missouri Eastern Division: Case No. 4:06-CV-978 TCM, Document 668, Apr. 6, 2009, 11 pages.
*Defendants' Reply in Support of Renewed Motion for Judgment as a Matter of Law, or in the Alternative for a New Trial, that the '944 and '313 Patents are Unenforceable, Avante International Technology Corporation*, Plaintiff, v. *Premier Election Solutions, et al*, Defendants; United States Eastern District of Missouri Eastern Division: Case No. 4:06-CV-978 TCM, Document 678 Apr. 20, 2009, 7 pages.

* cited by examiner

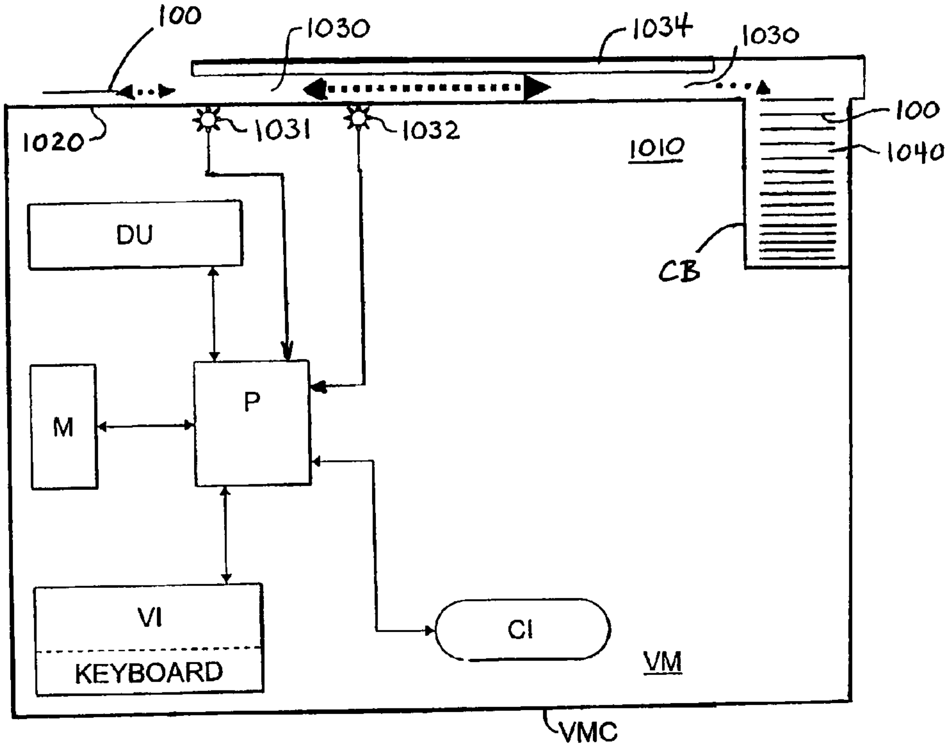
FIGURE 1
FIGURE 2
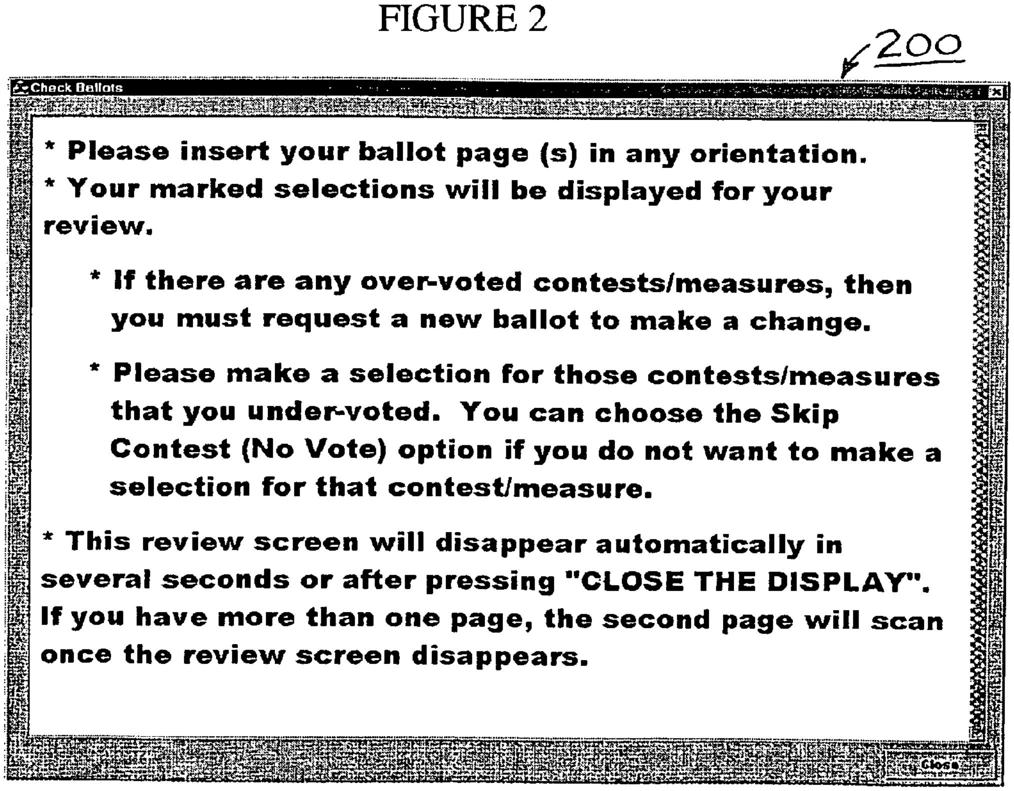

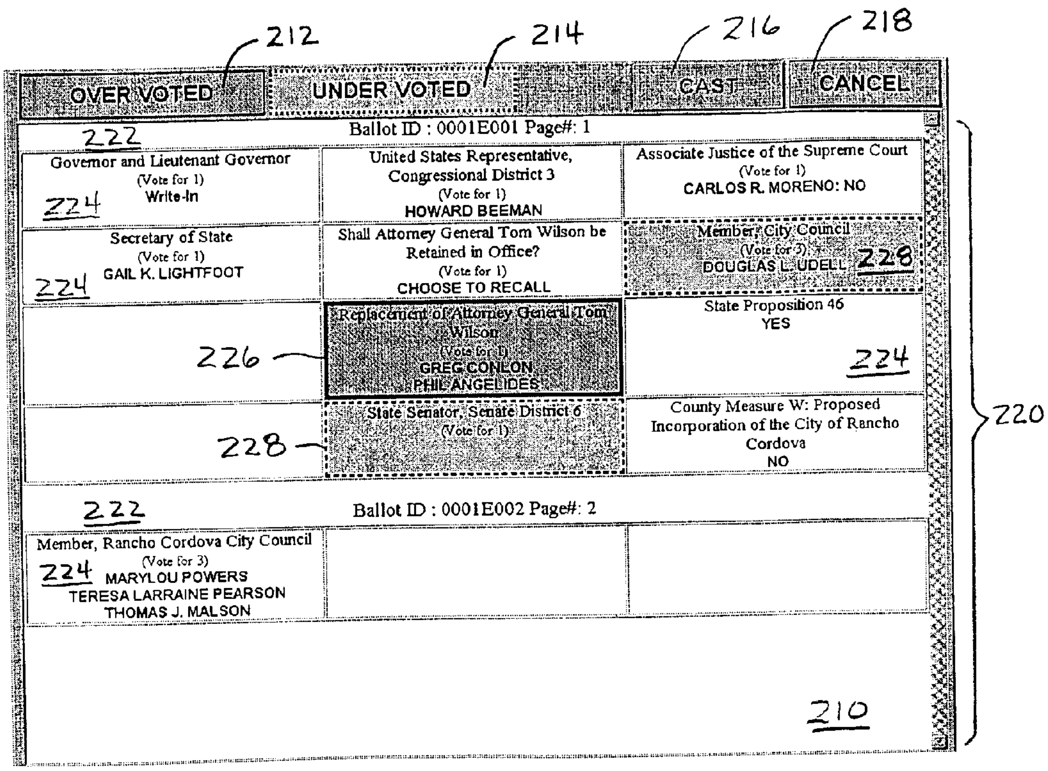
FIGURE 3
FIGURE 5
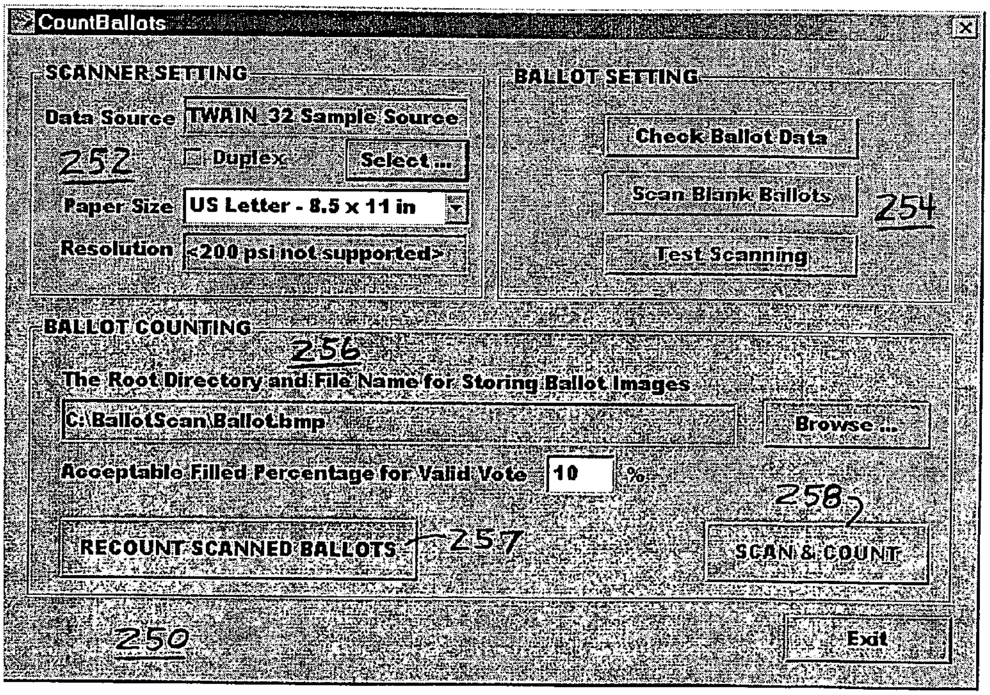

READER FOR AN OPTICALLY READABLE BALLOT

This application is a continuation of U.S. patent application Ser. No. 10/924,037 filed Aug. 23, 2004 now abandoned which claims the benefit of:

U.S. Provisional Application Ser. No. 60/498,012 filed Aug. 25, 2003,

U.S. Provisional Application Ser. No. 60/549,297 filed Mar. 2, 2004, and

U.S. Provisional Application Ser. No. 60/575,198 filed May 27, 2004, each of which is hereby incorporated herein by reference in its entirety;

and is also a continuation-in-part of U.S. patent application Ser. No. 10/410,824 filed Apr. 10, 2003 now U.S. Pat. No. 7,077,313, which is incorporated herein by reference and which is a continuation-in-part of U.S. patent application Ser. No. 10/260,167 filed Sep. 30, 2002 now U.S. Pat. No. 6,892,944 which claims the benefit of U.S. Provisional Application Ser. No. 60/326,265 filed Oct. 1, 2001, U.S. Provisional Application Ser. No. 60/341,633 filed Dec. 19, 2001, U.S. Provisional Application Ser. No. 60/377,824 filed May 7, 2002, U.S. Provisional Application Ser. No. 60/382,033 filed May 20, 2002, U.S. Provisional Application Ser. No. 60/385,118 filed May 30, 2002, U.S. Provisional Application Ser. No. 60/389,635 filed Jun. 17, 2002, and U.S. Provisional Application Ser. No. 60/403,151 filed Aug. 12, 2002.

The present invention relates to a reader for an optically readable ballot, and, in particular, a reader that reads and displays a ballot.

Optically readable ballots, typically paper ballots marked with voting selections by a voter, provide an easily read means of voting wherein a tangible record of the votes cast is maintained on the paper ballots, i.e. a so-called "audit trail" that is considered important for preventing vote fraud, or at least making it more difficult and detectable. One disadvantage of optically read ballots is that the ballots must be physically secured, then taken to a central election processing location and then fed through ballot readers to be read and the votes thereon tabulated. Thus there is a significant delay between the time when the polls close and when the in tabulation of the votes cast is available. In addition, if ballots are over-voted are typically disqualified and ballots that are under-voted may be due to an unintended voter oversight. As a result, the voter does no and cannot know whether his vote was counted accurately.

Some of these issues are addressed by direct recording electronic (DRE) voting machines wherein a voter casts his vote using a touch screen, a keyboard or by pressing buttons, and the vote is then electronically recorded in a memory within the voting machine. DRE voting machines usually provide for electronic vote tabulation via electronic file transfer, sometimes even by electronic communication (e.g., via telephone, a network and/or the Internet), and so they can substantially reduce the delay between poll closing and availability of tabulated results, and have the potential for producing reliable and accurate vote tallies. However, almost all available DRE voting machines provide no permanent, independently verifiable record, i.e. no audit trail, of the votes cast. As a result, the voter does not and cannot know whether his vote was counted accurately, and computer scientists and others have vocally criticized electronic voting.

(The models EVC308-SPR-FF and EVC308-SPR voting machines presently offered under the VOTE-TRAKKER™ name by Avante International Technology, Inc. of Princeton Junction, N.J., are exceptions that do provide a verifiable audit trail. These voting machines provide a contemporaneous tangible receipt (e.g., a printed receipt) of each voter's vote that can be inspected by the voter and that is available for later verification of the electronically tabulated vote.)

Accordingly, there is a need for apparatus that will preserve the advantages of an optically-readable ballot and that will also provide advantages associated with electronic voting, all while giving the voter confidence that his vote was counted accurately.

To this end, a ballot reader may comprise an imager for imaging an optically-readable ballot, a processor for processing the ballot image, a display for displaying the processed ballot image, and means for casting the ballot and for returning the ballot uncast. A memory stores the ballot image and a container may receive the ballot, if the ballot is cast.

BRIEF DESCRIPTION OF THE DRAWING

The detailed description of the preferred embodiment(s) will be more easily and better understood when read in conjunction with the FIGURES of the Drawing which include:

FIG. 1 is a schematic block diagram of an example embodiment of a reader as for an optically-readable ballot;

FIG. 2 is an example of an instruction screen image that may be displayed on the example reader of FIG. 1;

FIG. 3 is an example of a ballot image screen that may be displayed on the example reader of FIG. 1;

FIG. 5 is an example of a ballot counting instruction screen that may be displayed in connection with the reading of optically-readable ballots by the example reader of FIG. 1.

Figure 4:
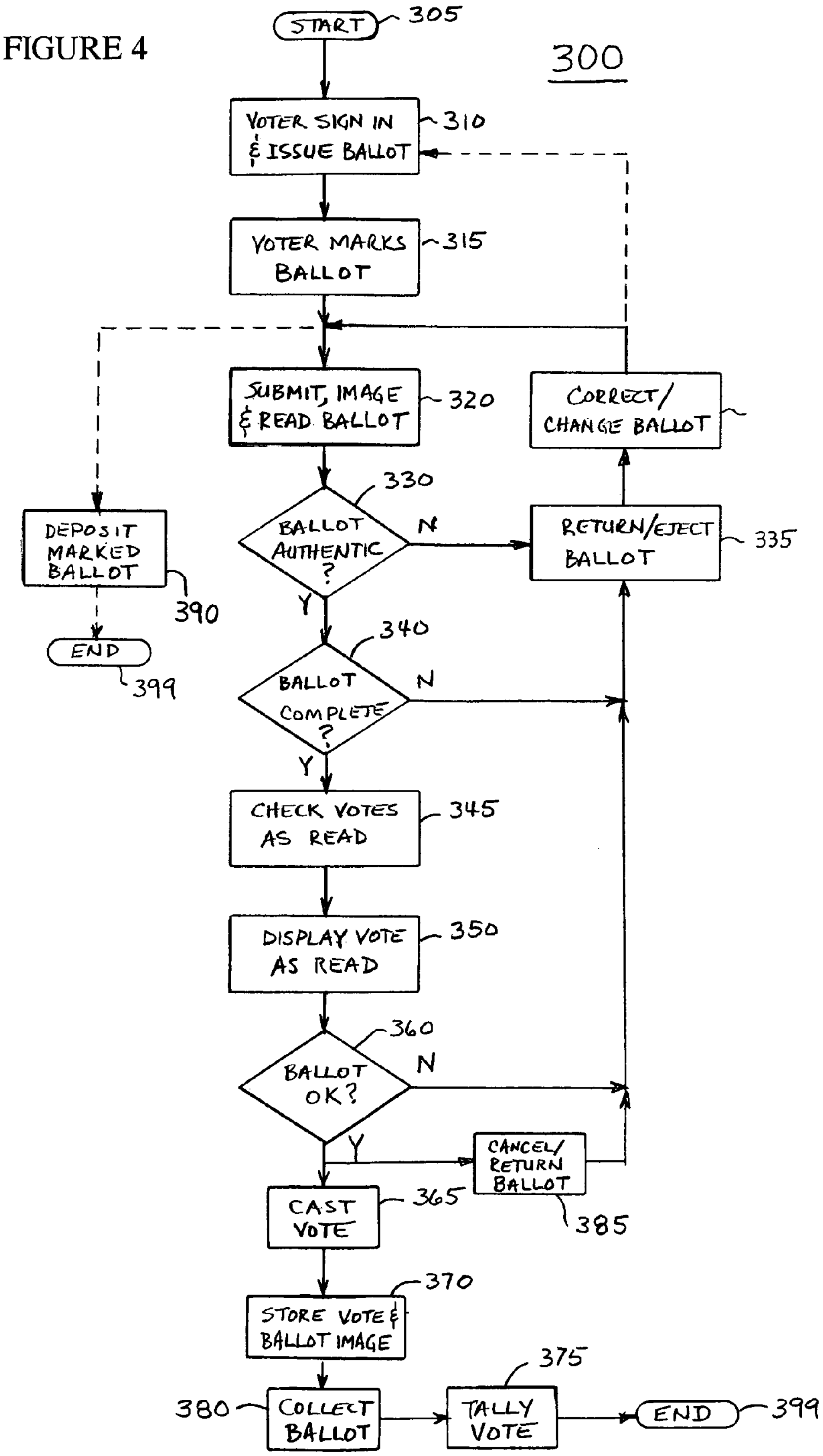
FIG. 4 is a schematic block diagram of an example process useful with the example reader of FIG. 1.

In the Drawing, where an element or feature is shown in more than one drawing figure, the same alphanumeric designation may be used to designate such element or feature in each figure, and where a closely related or modified element is shown in a figure, the same alphanumerical designation may be primed. Similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

FIG. 1 is a schematic block diagram of an example embodiment of a reader VM as for an optically-readable ballot. Specifically, ballot reader VM is intended for use in a polling place, e.g., any place at which a voter may submit a marked (voted) optically-readable ballot at any time, and preferably provides many or all of the following functions or steps:

imaging (reading) the ballot, authenticating the ballot;

checking the voted ballot for undervotes, overvotes, and missing pages, returning the ballot if the ballot is not authentic or is incomplete, i.e. if any page is missing, displaying the votes cast on the ballot as read, displaying undervotes and overvotes, offering the voter the opportunity to either cast the ballot or to change the ballot, and if the voter opts to change the ballot, then returning the ballot and not casting the vote thereon, or if the voter opts to vote the ballot, then collecting the ballot, storing the ballot image and casting the vote recorded thereon.

The voter may opt to change the ballot because the ballot as read does not reflect the voter's intended votes or because the voter incorrectly marked any one or more votes, undervoted and/or overvoted. Depending upon the applicable election rules and practice, the voter in this case either makes any desired changes on the returned ballot or exchanges the returned ballot for a new ballot form and marks his vote thereon. The voter then returns to reader VM to preview and, at the voter's option, submit the changed or replacement ballot according to the foregoing steps.

While referred to as reader VM, ballot reader VM is in actuality much more than simply a reader in the conventional sense—it is an electronic voting machine VM that processes optically-readable ballots in a unique manner that, if properly utilized, can facilitate voter confidence in the election process and reduce the likelihood of voting errors.

In FIG. 1, ballot reader VM includes a reader device 1010 for imaging an optically-readable ballot 100, a processor P for processing information relative to the imaged ballot 100, a non-volatile memory M for storing ballot images (and voting results), a display unit DU for displaying information relating to the imaged ballot 100 to the voter, and a voter interface VI (which may be separate from or integral to display DU), whereby the voter can enter information into ballot reader VM for processor P and/or memory M.

Certain components of ballot reader VM may be similar to the components of a personal computer and so it is likely that conventional computer components, particularly processor P and memory M, may be utilized in conjunction with displays DU and input devices VI adapted to or customized for the ballot reader VM application, for example, for ruggedness, resistance to tampering and/or abuse. Voter interface VI may be a touch screen and so would include display DU and a data entry device in a single component.

Ballot reading device 1010 has an input container or slot 1020 into which a ballot 100 to be read (imaged) is placed for being fed through transport path 1030 to a secure output container CB, 1040 into which ballots 100 that have been read (imaged) as they pass through transport path 1030 are deposited, i.e. are collected. Therebetween, ballot transport path 1030 defines a path through which ballots 100 are transported for being read (imaged) as they are transported between input container 1020 and output container 1040. Transport path 1030 may include two readers 1031 and 1032 of reader device 1010 which read the information and/or markings on ballots 100 as they pass thereby, e.g. for redundancy and/or verification of information read. Container CB, 1040 is for receiving the ballot if the ballot is cast, and preferably only if the ballot is cast.

Preferably, ballots 100 are optically-read ballots 100 and readers 1031 and 1032 are optical readers/imagers. Member 1034 may be a guide for transport path 1030 that prevents ballot 100 once it has been imaged from being removed, and may also provide a light shield for optical readers 1031, 1032, all within secure container VMC. Typically, an optically-readable ballot 100 moves past imagers 1031 and 1032 whereat it is imaged and then stopped to await the voter's confirmation that the vote marked thereon as read by imagers 1031/1'032 is correct. If ballot 100 is correct and the vote thereon is cast, ballot 100 is then moved along path 1030 and is deposited in secure container 1040. If the vote as displayed as read from ballot 100 is incorrect, or if ballot 100 is incomplete, or if ballot 100 contains an illegal vote, ballot 100 is returned to the voter at input 1020, as indicated by the double ended arrows in FIG. 1.

A ballot "returned" is physically ejected by the scanner transport mechanism 1030, typically by being transported along the same path over which it was scanned but in the opposite direction so that it is presented to the voter at the same slot or opening into which it was initially placed. e.g., as indicated by double-ended arrows. A ballot to be returned is never collected as are ballots that have been authenticated, imaged, found complete and cast.

Optical reader VM is enclosed in a secure container VMC to protect the apparatus therein from damage and tampering, and so that the paper ballot 100 once inserted therein (submitted) is not accessible to the voter or anyone else. The paper ballot once submitted must be automatically collected in a secure container or collection box CB and the vote marked thereon as read is cast electronically, or the ballot must be returned to the voter and no vote is recorded. When a ballot is returned, all ballot pages submitted are returned and neither the ballot image(s) thereof or the vote(s) marked thereon are stored.

It is noted that conventional optical readers typically have only one optical reader and must be preprogrammed with a template corresponding to the particular ballots to be passed therethrough and read, and so the ballots must be sorted by jurisdiction and the like so that only ballots of the same form, i.e. of the form that corresponds to the preprogrammed template, are passed through to be read at any one time. Conventionally, ballots of different format must be passed through as separate batches after the corresponding template therefor has been programmed into the optical reader. Even if a conventional optical reader were to have two optical readers, both optical readers thereof would be programmed for reading the ballots against the same preprogrammed template, i.e. would be for making redundant readings for verifying the correctness of either reading against one predetermined preprogrammed template.

On the other hand and optionally, reader 1010 may include two readers 1031 and 1032 and a processor P that cooperate for reading ballots 100 of different forms without the need to pre-sort the ballots into groups of like form. Specifically, optical reader 1031 may read ballot 100 for reading a ballot identifier (VID) number thereon and communicate the VID number to processor P. Reader 1031 need not, but may, read any other part of ballot 100. Processor P is responsive to the VID number read from each ballot 100 by reader 1031 to identify and select the ballot template corresponding thereto. Optical reader 1032 would then read ballot 100 for reading the mark spaces thereon that have been marked for comparison in accordance with the ballot template selected by processor P.

It is noted that ballot reader 1010 may similarly image the ballot and cooperate with processor P to select the appropriate ballot template even if only one reader 1031 or 1032 is employed. The ballot image from reader 1031 or 1032 is processed by processor P to identify the VID identifier therein, specifically the jurisdiction identifier portion thereof, which may be utilized for selecting the appropriate template for reading the ballot image.

If utilized, the VID number read from each ballot 100 by reader 1031 should include at least jurisdictional information fields thereof, e.g., fields utilized to identify the voting jurisdiction to which the ballot pertains and to select the ballot template corresponding to that jurisdiction. Optical reader 1031 should also read the unique random number field, e.g., a field having a random number that may be utilized to authenticate the ballot 100 and that may also be utilized to associate the stored image of the ballot 100 with the physical paper ballot 100, e.g., so that the unique random number portion of the VID is associated with the stored ballot image information and is available for later verification of the ballot and/or of the correct reading thereof, as well as for tracking of the vote by the voter, e.g., via an Internet or other posting, wherein vote posting by random number is provided. Where VID is on ballot 100 in two different forms, e.g., in machine-readable form and in human-readable form, reader 1010 may have the ability to read both forms of the VID, e.g., a bar-code reader and an OCR reader, usually in processor P.

Reader 1032, if provided, need not read (image) portions of ballot 100 other than those containing valid mark spaces 112 according to the template corresponding to that ballot. The unnecessary portions of ballot 100 not containing valid mark spaces may either not be read or may be read and then discarded while retaining the readings of mark spaces. Only images of the VID and mark space zones need be obtained and stored for tabulating and/or verifying voting by a vote counter comprising processor P and memory M, for example. Images of the ballot, including VID and mark space zones, may be stored in any suitable electronic format including but not limited to .BMP, .TIFF, .PDF or any other suitable format. In this way, the amount of storage capacity needed to store the information read (imaged) from each ballot is substantially reduced because the standardized information, e.g., names of contests, names of candidates, and the like, are not stored. On the other hand, full images of ballot 100 may be stored for providing a full audit trail between the ballot images stored in memory M and the ballots 100.

As a result, ballots 100 placed into input 1020 do not have to be pre-sorted to be of the same format, but may be of different formats because readers 1031, 1032 in cooperation with processor P may determine the proper template to be utilized for reading each ballot 100 according to its format. Specifically, because the information in each VID number printed on each ballot 100 define the particular voting jurisdiction (e.g., state, county, municipality, precinct, ward and/or political party), they also define the form of ballot 100 for such jurisdiction. From the VID number read, e.g., by optical reader 1031, processor P determines the jurisdiction and the ballot form therefor and supplies the template therefor for use in conjunction with the pattern of mark spaces marked on ballot 100 for determining the voting selections made thereon.

Simply put and by way of example, reader 1031 may read the VID number from a first ballot 100 of form A and may signal same to processor P which then provides the mark space template for ballots 100 of form A for reading (imaging) the marked voting selections from first ballot 100 read (imaged) by optical reader 1032 and displayed on display DU. If the voter casts the ballot 100, the marked voting selections read (imaged) by reader 1032 are then tabulated as votes by processor P and memory M.

Next, reader 1031 may read the VID number from a second ballot 100 of form B presented by another voter and may signal same to processor P which then provides the mark space template for ballots 100 of form B for reading (imaging) the marked voting selections from second ballot 100 read (imaged) by optical reader 1032 and displayed on display DU. If this voter casts his ballot 100, the read (imaged) marked voting selections are then tabulated as votes by processor P and memory M.

Next, reader 1031 may read the VID number from a third ballot 100 of form C and signals same to processor P which then provides the mark space template for ballots 100 of form C for reading (imaging) the marked voting selections from third ballot 100 read by optical reader 1032 and displaying same on display DU. If this voter casts his ballot 100, the read marked voting selections are then tabulated as votes by processor P and memory M. If the next ballot is of form B, for example, reader 1031 reads the VID number from that ballot 100 of form B and signals same to processor P which then provides the mark space template for ballots 100 of form B for reading (imaging) the marked voting selections from that ballot 100 read (imaged) by optical reader 1032 and displaying same on display DU. If this voter casts the ballot, the read (imaged) marked voting selections are then tabulated as votes by vote counter 1060, and so forth. The foregoing process repeats for each ballot 100 read (imaged) by reader 1010 wherein the template for each ballot is selected by processor P responsive to the VID number read from that ballot, i.e. specifically responsive to the jurisdictional information defined in fields of the VID number.

Accordingly and preferably, but optionally, an optical reader VM for reading paper ballots 100 having a jurisdiction identifier thereon and having voting selections marked thereon, comprises a transport path 1030 for transporting paper ballots 100 between an input and an output thereof; a first optical reader 1031 for reading the jurisdiction identifier of each paper ballot 100 transported on said transport path 1030, and a second optical reader 1032 for reading the voting selections marked on each paper ballot transported on said transport path 1030. Processor P receives the jurisdiction identifier read by the first optical reader 1031 for each paper ballot 100 for selecting a template for reading in accordance with the selected template the voting selections marked on each paper ballot 100, whereby the voting selections marked on each paper ballot 100 are read in accordance with a template corresponding to the jurisdiction identifier for that paper ballot 100. Alternatively, only one optical reader 1031, 1032 may be employed, or if two optical readers 1031, 1032 are provided, both may image the ballot 100 to provide a redundant ballot image which may be utilized to improve the reliability of ballot reading wherein both images are decoded to determine the voting selections marked thereon, which two decoded ballot images may then be compared for their confirming the reliability of the decoding of ballot 100 information.

In addition and optionally, processor P may include optical character recognition (OCR) software to provide alphanumeric outputs of the information in the VID field read (imaged) by reader 1031 and/or of write-in information in the write-in portions of the voting fields read (imaged) by reader 1032 according to the template selected by processor P. It is preferred that reader 1010 move ballots through transport path 1030 at the rate of at least about 10-12 inches per second (about 25-30 cm/sec.) so that ballots on either 8½×11 inch paper and/or on A4 paper may be read at a rate of at least about one ballot per second. It is also preferred that readers 1031 and 1032 have a resolution of at least about 100 dpi or greater, and it is desirable in some cases that reader 1010 provide dual-side document scanning.

Reader VM in checking a ballot 100 preferably signals or otherwise provides a notice or indication if a ballot 100 is under voted (i.e. less than the required number of spaces have been marked for each contest/question) or is over voted (i.e. more than the required number of spaces have been marked for each contest/question, which may invalidate a vote in a contest/question or may invalidate an entire ballot) or is otherwise incorrectly marked. Ballot checking may be utilized with straight voting, ranked voting, and/or cumulative voting similarly, e.g., indicating if improper ranking has been marked and/or if the wrong number of cumulative votes have been marked. While such checking function advances the goal that ballots reflect voter intent, it can reduce, but not eliminate, under voting and over voting; however, it will at least give the voter an opportunity to correct such condition or at least indicate an intentional "no vote" if a "No Vote" or "Abstain" mark space is marked.

Ballot checking by reader VM may avoid or at least mitigate the condition where the intent of the voter cannot be determined because under and over voting can be reduced and/or eliminated. However, where applicable law allows, under and over voting in cumulative voting contests may be adjusted and/or rectified when the ballot is counted by applying proportioning and/or normalizing rules to the votes actually cast by marking mark spaces, e.g., by adding or subtracting a proportionate weighted vote. Ballot checking may be preformed by a reader VM which may include an imager based on commercial office imaging equipment.

While the reader arrangement described in the immediately preceding paragraphs is preferred, optical ballots 100 including a VID number as described herein may be sorted and read by conventional readers in the conventional manner, assuming, of course, that the election officials are willing and able to sort the paper ballots into groups of like form, or to have the voters utilize a reader VM that is pre-programmed for the jurisdictional ballot form utilized by that voter in voting. Ballot readers VM as described herein may utilize all or part of conventional ballot readers and/or may utilize parts of conventional office equipment such as copiers, scanners, facsimile (fax) machines, and other commercial imaging and/or scanning devices, and the like, e.g., for imaging and/or optically reading the information contained on an optically-readable paper ballot 100.

Conventional ballot readers such as the SCANMARK ES2800 reader available from Scantron located in Tustin, Calif., employ sensors positioned on a fixed grid pattern (e.g., in columns) corresponding to the fixed grid pattern of the mark-sense spaces of the ballot sheets with which they are utilized, and such readers do not image a ballot and so they cannot identify or determine pixel density and/or location as may be done for a true ballot image. An example of a conventional optical image scanner includes the PAGESCAN II reader available from Peripheral Dynamics. Inc, located in Plymouth Meeting, Pa. It is noted that this scanner can provide an image of a ballot or other document or sheet, and can be programmed to define multiple image areas. Examples of commercial imaging scanners include types DR5020 and DR5080 available from Canon Electronics, Inc, located in Japan, and type IS330DC available from Ricoh Company located in Japan.

In addition, the "trial" ballot reader as described is preferably provided at each polling place so that a voter has the opportunity to have his voted ballot scanned privately and to have the voting selections read therefrom be displayed to him privately so that the correctness thereof may be confirmed before the ballot is cast. Preferably, as is described, the trial ballot scanner VM employs the same reading apparatus and method as ballot scanners that may be utilized to read the ballot in re-counting and re-tabulating the vote, should that become necessary, e.g., as where a recount is declared.

Memory M may also be of any suitable non-volatile memory type. Suitable memory devices include floppy disks, computer hard disk drives, writeable optical disks, memory cards, memory modules and flash memory modules (such as those utilized in electronic cameras), magnetic and optical tapes and disks, as well as semiconductor memories such as non-volatile random-access memory (RAM), programmable read-only memory (PROM), electronically erasable programmable read-only memory (EEPROM) and the like. Memory M or a separate memory contains the operating system, data base and application software that operates processor P as voting machine VM. Preferably, memory M includes plural separate and independent memories for providing redundant storage of ballot images and other voting information.

Alternatively, various programming information, a ballot identifier list, and the like may be provided in firmware, such as in an EPROM, which provides additional resistance to tampering and/or hacking attack. Such firmware may be utilized, for example, for controlling the reading and writing of information from optically-readable ballots, the storing of voting record information such as ballot images in memory M, particularly, a specific memory device such as a memory chip card, an optical disk or tape, or other electronic, magnetic or optical media. Preferably, memory M of ballot reader VM includes two independent non-volatile memory devices so that voting record information such as ballot images are stored on two separate, independent memory devices for redundancy and preservation of at least one copy of the accumulated voting records in the event one of the memory devices fails or otherwise becomes inoperative. Desirably, the two non-volatile memories are of different types, such as a semiconductor memory and a hard disk, or a memory card and an optical disk, or any other convenient combination.

Voter interface VI is preferably a touch-screen interface associated with display unit DU, but may be a standard or custom keyboard, or may be dedicated vote buttons or switches, and is typically connected to processor P via cabling. Special keys can be provided for voting functions such as "Cast Ballot" or "Return Ballot" or "Cast ballot even though it contains error(s)". Alternative voter interfaces VI may include voice recognition apparatus, Braille keyboards or pen systems with writing recognition interfaces, each preferably with confirmation of the data displayed on display unit DU and entered by the voter, such as by an audible response, e.g., via a headphone or a loudspeaker, or by a Braille or other tactile device.

In addition, a voter interface VI for allowing visually impaired voters to vote without assistance may employ a modified standard keyboard, of which only certain keys are responded to by processor P, in combination with an aural device. E.g., only the four keys (buttons) at the corners of a numeric keypad or the four areas (buttons) in the four corners of a touch screen may be enabled to indicate possible selections such as cast vote, return ballot, and the like, with audible voice instructions and confirmation of buttons pressed provided via a headphone. A typical function assignment to the corner keys can include: upper right key="repeat" (to hear voice message again), lower right key="Cast Vote" (to vote the imaged ballot), lower left key="Return Ballot" (to eject the ballot for change or correction), and upper right key="Increase Speed" (to increase the rate at which contests and/or voice indications are presented). Any or all of these functional keys may be exaggerated in size or otherwise made easily distinguished by tactile feel. Such keyboard/button programming is commonly provided by software.

Display unit DU may be of any suitable type, such as a conventional cathode ray tube or computer display, an LCD display, a touch-screen display or other suitable device, for displaying images, alphanumeric and/or graphical information, and is typically connected to processor P via cabling. Display unit DU may also include Braille devices, aural information via headphones, or other devices specially suited for people with handicaps.

Preferably, ballot reader VM displays on display DU the vote as marked on the optically-readable ballot 100 scanned, and requires at least one confirmation, and preferably a second confirmation, by the voter that the displayed voting record is indeed the vote(s) the voter intended to cast, in order to cast the ballot. Information as to any offices or questions or referenda with respect to which a vote has not been cast can also be displayed and called to the voter's attention before the ballot review session is concluded. Upon the voter confirming the displayed vote, the electronic data thereof is provided to the memory M of voting machine VM. Preferably, the same electronic data provided to display unit DU to be displayed to the voter is communicated to memory M over a common path so there is certainty of consistency, although this is not necessary as it may be convenient for processor P to provide such electronic data in the particular forms required by memory M. It is preferred, but not necessary, that the ballot image of ballot 100 be stored in memory M.

The preferred ballot reader apparatus as illustrated by FIG. 1 preferably provides at least double redundancy for voting record and ballot image data in that each vote is recorded by at least two independent and verifiable means: to wit, by electronic recording in one or more electronic memories included in each machine, and by the collected optically-readable ballot. Desirably, the preferred apparatus as illustrated by FIG. 1 provides triple redundancy for voting record and ballot image data in that each is recorded in at least two independent electronic memory devices as well as being preserved on the collected optically-readable ballot.

A processor P within voting machine VM typically employs application specific computer software or an applications shell in conjunction with a standard relational data base computer program to operatively function with ballot imager 1031, 1032 for reading optically-readable ballots 100 and for writing data such as ballot images to be stored in the memory M thereof. The computer software for processor P typically may utilize the "Visual Basic" programming language and a relational data base such as the "Access" data base, both of which are available from Microsoft Corporation located in Redmond, Wash., and may be stored on any convenient medium, such as software stored on a floppy disk or a hard drive or as firmware stored in an electronic memory or the like.

Optionally, one or more voting machines, e.g., VM-1, VM-2, . . . VM-n may be provided for voters to insert their marked optically-readable ballots 100 and to cast their votes, such as for candidates for office, or for or against public questions, referenda, constitutional amendments and the like, in accordance with governing law. Voting machines VM-1, VM-2, . . . VM-n may be together at a common location, e.g., a polling place, or may be dispersed in any convenient number of places.

At the end of the prescribed period for voting, e.g., when the polls close, voting machines VM my be coupled to a central computer and may communicate either the accumulated voting result or individual voting records or ballot images, or all of the foregoing, to a central computer which then combines the voting data from voting machines VM to tabulate and produce vote results. Typically, the central computer would be located in a secure area or facility, such as a county or state election office, or both. Whether plural voting machines VM are located in close proximity, such as at one polling place or in a central facility to which they are brought at the conclusion of voting, or at diverse locations, communication by such machines with the central computer may be through a communication device CI, for example, a hub, a local communication hub, a local area network, the Internet, a server, the public telephone network, an electrical cable, or the like, or the memory or memories M may be removed from the voting machine VM and inserted into a reader associated with the central computer for reading the voting results stored in such memory or memories M.

It is noted that the present arrangement provides complete freedom to the voting (election) authorities as to how and when the voting data is communicated to the central computer. It may be communicated essentially in real time as each ballot is approved by the voter and the voted ballot 100 is cast, or at the end of each voting session, i.e. immediately and sequentially, or may be communicated periodically either through out the appointed period for voting or at the conclusion of voting, either from the voting machines while still at the polling places or from a central or other facility to which the voting machines VM are transported. Vote results may be announced or may be posted on the Internet or otherwise communicated as is desirable and convenient, either as cumulative results and/or as a collection of individual voting records.

For security and confidentiality, voting information communicated from one apparatus to another, whether such is in a common location or in separate or distant locations, is preferably encoded or encrypted, such as by public key and/or private key encryption or other encryption, as is conventional. Even where the voting information is communicated over communication links CI to which an unauthorized person may gain access, such as public telephone lines, radio communication or the Internet, the apparatus described provides additional security because there is always at least one separate set of records comprising the optically-readable ballots stored in the collection boxes 1040 of voting machines VM against which the otherwise communicated voting information can be compared and verified.

Thus, whether the election is local, regional, statewide or nationwide, the arrangement of the apparatus described is arranged for avoiding and circumventing any possible tampering and/or hacker attack. Of course, transporting the voting machines to a central facility with appropriate security avoids the possibility of tampering or hacking.

In the event any question arises as to the outcome of the voting, such as where the result is a very close or where the integrity of the primary vote results are challenged or questioned, a parallel and independent counting of the vote may be made utilizing the optically-readable ballots collected in secure collection box CB. The collected ballots in box CB may be processed through and are read by another reader VM and the voting results, either as a cumulative vote result or as a collection of individual voting records, or both, are produced thereby as vote result which is available for comparison to the primary vote result obtained from each reader VM or a collection of readers VM.

An example of the display of screens for voting using an electronic voting machine and the operation of a user interface including a display screen and a data input device, e.g., a keyboard and/or a touch screen display, as well as the electronic counting and/or tabulation of votes, are described in U.S. patent application Ser. No. 09/737,306 filed Dec. 15, 2000 and Ser. No. 10/255,348 filed Sep. 26, 2002, each of which is entitled "ELECTRONIC VOTING APPARATUS, SYSTEM AND METHOD" and is hereby incorporated herein by reference in its entirety.

An example of an optically-readable ballot and apparatus for reading and/or imaging same, as well as the method for reading such ballot and operating such apparatus, are described in U.S. patent application Ser. No. 10/410,824 filed Apr. 10, 2003, entitled "ELECTRONIC VOTING METHOD FOR OPTICALLY SCANNED BALLOT" which is hereby incorporated herein by reference in its entirety.

In addition, an optically-readable ballot may have in or associated with the ballot identifier a page number where the ballot has plural pages. The page numbers would be sequential, and the ballot may be printed with ballot information on one side or on both sides of each sheet. Including a page number in the ballot identifier permits the ballot when scanned, i.e. imaged, to be decoded and checked to determine whether all pages that should be present are present. While pages being out of sequential order may not matter, having all pages of a sequence is important so that it can be determined whether a complete ballot has been scanned. Absence of one or more pages could indicate a scanning error, e.g., a double page feed or only one side of a two-sided ballot being scanned, or a missing page or sheet. In any case, it is important that a complete ballot be scanned (imaged) so that the complete ballot is completely and properly imaged and the vote marked thereon properly counted.

Further, it is preferred that the optically-readable ballot include fiducial or positional marks that allow the orientation of each page of a ballot, and of an image thereof, to be processed irrespective of its physical orientation when scanned or imaged. Typical marks include one or more of a "+" or bulls eye or other mark that defines its location, and an asymmetric arrangement of such marks is typical, e.g., three marks located near three of the four corners of a page. Such marks are easily identified in the ballot image and so allow ballot orientation to be determined and the ballot read from its image, as well as scaling of a ballot image because the distance between such marks on the ballot is predetermined.

FIG. 2 is an example of an instruction screen image 200 that may be displayed on the example reader of FIG. 1. Reader VM in starting state awaiting insertion of an optically-readable ballot typically displays on its display DU a screen 200 of information to be presented to the voter when the voter approaches reader VM to preview his marked ballot. The screen 200 provides information relating to the use of the ballot screening reader VM, such as instructions to insert the ballot pages, and advising that the marked voting selections will be displayed. Screen 200 also advises as to the applicable rules for correcting undervotes and overvotes, such as that a new ballot form must be obtained to make changes to the ballot, e.g., to correct an overvote, and that undervoting may be corrected by making additional selections on the same ballot form.

In addition, screen 200 may advise that a "Skip Contest (No Vote)" option is available on the ballot form if the voter desires not to vote in any given contest or question, and/or may explain how the review screens appear and/or react to voter actions, e.g., as where a plural page ballot is in use. Typically, although not necessarily, marking the "Skip Contest (No Vote)" box for a contest indicates that any undervote with respect thereto is intentional, e.g., is an abstention, and should not be reason to reject or return a ballot.

FIG. 3 is an example of a ballot image screen 210 that may be displayed on the example reader VM of FIG. 1. Screen 210 typically includes instructional information and action buttons for the voter to touch or press to initiate certain actions by reader VM, such as the overvoted 212 and undervoted boxes 214 that indicate by their color how an undervote and an overvote is indicated on the ballot display portion 220 of screen 210. Action buttons 216, 218 provide the buttons by which the voter causes reader VM to perform an action. For example, touching/pressing button 216 causes the voted ballot that is displayed 220 to be Cast (i.e. the ballot form from which it was read is collected automatically and the vote read therefrom is counted), and touching/pressing button 218 causes reader VM to return the physical ballot to the voter without counting the vote thereon.

Ballot display region 220 includes a plurality of defined regions 224, typically boxes defined by an outline, in which the various contests on the ballot are displayed, typically one per region 224. Ballot display regions 224 typically identify each contest (e.g., "Governor" or "United States Representative" or "State Proposition") and the allowed voting (e.g., "vote for 3") and may display all of the candidates and selections or may only display the selection marked on the ballot read. If all candidates and selections are displayed, then the selected one(s) are typically indicated by color or bolding or background color.

In ballot display 220, regions 220 that have been overvoted are indicated so as to stand out, e.g., typically by being filled with a background color that is the same as the color of the overvote box 212. Similarly, regions 220 that have been undervoted are also indicated so as to stand out, e.g., typically by being filled with a background color that is the same as the color of the undervote box 214. In the illustrated example screen 210, region 226 is highlighted to indicate an over vote and regions 228 are each highlighted to indicate an undervote. Undervotes and overvotes may be indicated by highlighting, outlining, flashing, blinking or otherwise so as to stand out, be distinctive and/or be easily recognized by the voter.

The ballot identifier and page number, if any, is typically displayed in a region 222 associated with the contests read from that ballot or page. Where a ballot has plural pages, more than one page thereof may be displayed by one screen 210 if the display d is of sufficient size to permit satisfactory readability or each page may be displayed by a separate screen 220 in which case "Next Page" and "Previous Page" buttons may be provided. In the example screen 210 illustrated, pages 1 and 2 of a ballot having the identifier 0001E001 are both displayed at the same time in page number order.

Display screens for voting that highlight and/or pop-up certain information on an electronic voting machine user interface including a display device and/or a touch screen display, are described in U.S. patent application Ser. No. 09/737,306 and No. 10/255,348 entitled "ELECTRONIC VOTING APPARATUS, SYSTEM AND METHOD" referred to above.

Where an optically-readable ballot includes one or more contests wherein the voting includes cumulative voting and/or ranked voting, the apparatus and method herein accepts and process such ballots. Examples of optically-readable ballots, including optically-readable ballots that provide for cumulative voting and/or for ranked voting in one or more contests, are described in U.S. patent application Ser. No. 10/410,824.

FIG. 4 is a schematic block diagram of an example process 300 useful with the example reader VM of FIG. 1. Process 300 starts 305 with a voter signing in 310 at a polling place and being issued 310 an optically-readable paper mark sense ballot form. The voter then marks 315 his voting selections on the mark sense ballot and when finished, is ready to cast his vote. Conventionally, the voter simply deposits 390 the marked ballot in a sealed container provided therefor, however, the voter will not have any indication that the manner in which he marked his voting selections on the ballot is proper for being read by the optical scanning apparatus that will scan the ballots and count the vote, whether the collection container is simply a container or scans the ballots as they are deposited therein.

The prudent voter will desire to utilize the apparatus and method described herein. To that end, the voter submits 320 the marked optically-readable ballot to a reader VM to be scanned and imaged, typically in a TIFF or a BITMAP image format. Reader VM processes the imaged ballots, i.e. the ballot images are processed to decipher the information printed thereon as well as information marked thereon by the voter, such as marked mark sense areas and write-in voting spaces. Preferably as an initial matter, reader VM processes the imaged ballot to authenticate 330 the ballot and to determine 340 whether all pages of the ballot have been submitted 320.

Typically, a ballot image in a TIFF or a BITMAP image format may be a file having a size in the range of about 3-500 kilobytes. Even with 500 kilobytes ballot images, an election for a voting population of 100,000 voters would require only about 50 gigabytes of memory which is well within the storage capacity of modern hard drives and other memory devices. For larger voting populations, the memory capacity of modern servers is sufficient to store ballot image records. After an election, preferably soon thereafter, the ballot images stored on one or more hard-drives may be copied to a more permanent medium, such as to a CD ROM disk, to a DVD disk, or to another write-once read many times medium, for redundant storage and for protection against change or corruption of data.

Ballot authentication 330 typically involves processing the ballot image for decoding of the ballot identifier which may include representations of the voting jurisdiction/precinct and a unique alphanumerical ballot identifier that is compared against a list of authentic ballot identifiers stored in the processor of reader VM for such purpose. If the unique ballot identifier matches a known authentic ballot identifier on the stored list, then the ballot is considered authenticated and is further processed. If not, the ballot may be returned (ejected) 335 or an election official may be summoned, e.g., as by an alarm or other audio or visual indication, to investigate. Once matched, a ballot identifier may be flagged on the stored list thereof as having been voted or may be removed from the stored list so as to prevent duplicate voting, e.g., as by submitting 320 a photocopy of an authentic ballot.

Ballot checking 340 also typically involves processing the ballot image for decoding of the ballot identifier which may include a representation of the ballot page numbers associated with the unique alphanumerical ballot identifier to determine whether all pages are present. The numbers of pages and page numbers of the ballot submitted 320 are processed to ensure that all pages associated with the unique ballot identifier have been scanned, e.g. by comparison against a list of ballot pages related to ballot identifiers stored in the processor of reader VM for such purpose. While it may be acceptable in certain cases to simply determined the number of pages submitted 320, at least as an initial step, it is preferred that each page number be checked to verify that each page number expected is indeed present and is present only once. The pages need not be in page number order when scanned, because the processor can order the pages in a desired sequence, if desired. If all of the pages of a given ballot have been scanned, then the ballot is considered complete 340 and is further processed. If not, the ballot is returned 335.

If a write-in vote is allowed, the ballot regions of the ballot image where write in votes may be made are checked 340 and, if a write-in vote is has been marked, the image thereof may be copied to a separate file in addition to their presence in the ballot image. The separate write-in vote images may be accumulated for later processing, e.g., by election officials utilizing manual or automatic means. In such case, any write-in votes also remain in the stored ballot image and so are available for recount or voting audit, if needed.

If the ballot is authentic 330 and is complete (all pages scanned) 340, then the ballot image for each page will be displayed 350, e.g., as described above in relation to FIG. 3. Some display 350 options include, e.g., full face or page-by-page displays of an actual ballot image or of a ballot image showing the voting selections made as read and decoded by reader VM. Preferably, the vote as decoded by the scanner is displayed 350 from the electronic record that will be stored if the ballot is cast, i.e. as late in the processing sequence as practical so that there is no opportunity for any disparity between the vote as displayed 350 and as stored 365. Write in votes may be included is such display 350.

Preferably, as part of the step of checking 340 the optically-readable ballot image, a check 340 is performed to determine if undervote or an overvote is present for any contest. In the ballot display 350, undervotes and overvotes may be highlighted, marked by a color that stands out, outlined, are made to blink or flash, or otherwise conspicuously identified so that the voter is highly likely to notice such issues and so be more likely to take steps to correct same.

Where an optically-readable ballot includes one or more contests wherein the voting includes cumulative voting and/or ranked voting, the apparatus and method herein accepts and processes such ballots. In the case of cumulative voting, ballot checking step 345 further checks to verify whether the number of cumulative votes marked constitutes an undervote or overvote and, if so, such contest is highlighted or outlined or colored to attract the voter's attention to increase the likelihood the undervote or overvote will be corrected.

Similarly, in the case of ranked voting, ballot checking step 345 further checks to verify whether the votes marked include the proper ranking (i.e. one vote ranked #1, one vote ranked #2, one vote ranked #3, etc.) and whether the marked vote constitutes an undervote (e.g., one rank omitted) or overvote (e.g., more than one vote for a given ranking). If so, such contest is highlighted or outlined or colored to attract the voter's attention to increase the likelihood the improper ranking, undervote or overvote will be corrected. Preferably, the display 350 indicates the nature of the voting error, e.g., by causing the missed ranking or the plural voted ranking to blink or flash.

Examples of optically-readable ballots, including optically-readable ballots that provide for cumulative voting and/or for ranked voting in one or more contests, and of a method for processing same, are described in U.S. patent application Ser. No. 10/410,824. Ballots may be of any size and format, e.g., punch card size, 8½×11 inch size, 11×17 inch size, A4 metric size or any other size. A ballot may be formatted as a full-face ballot, a plural page ballot, a summary ballot, may have voting selections indicated by numbers and/or contest/issue information and/or candidate name, and the like, and/or may have mark sense areas on one or both sides, i.e. may be a single-sided or a two-sided ballot.

Herein is a significant advantage of the described arrangement in that the voter has the opportunity to review the result of his marked optically-readable having been read by the optical reader VM and so to have greater confidence that his vote as intended has been properly and completely read and will be accurately cast and counted. Moreover, in addition to the accuracy provided by the electronic processing of the vote, a complete and verifiable paper audit trail is provided by the marked paper ballots in the collection container.

If the voter is satisfied 360 that his intended voting selections have been made and properly decoded by reader VM, then the vote thereon may be cast 365. Casting the vote 365 may include several substantially contemporaneous actions such as storing 370 the ballot image, storing 370 a summary voting record and/or accumulating 375 the vote with vote counts previously stored. Such information may is preferably stored 370 in plural separate and independent secure memories for redundancy and security. If desired or required, a separate and independent secure memory may be provided for each of the ballot image, the voting record and the vote tabulation, i.e. the three types of data are stored in three separate memories, and each of these three memories may also be redundant.

Casting the vote 365 also initiates the automatic collection 380 of the ballot, which has remained in reader VM since it was submitted 320, into a secure collection container. Preferably, the ballot pages submitted 320 to reader VM are not accessible to the voter except by using the commands (cast ballot 365 or return ballot 385) displayed 350 by reader VM. As far as the paper ballot is concerned, there are only two possible choices—either the vote marked thereon as read therefrom is cast and the ballot collected, or the ballot is returned and no vote is recorded therefor. When a ballot is returned, all ballot pages submitted are returned.

Even if the voter is satisfied 360 and acts to cast the vote, the vote may be cast 365 or not cast as required by applicable voting standards, laws and rules, as well as by prudent computing protections. For example, reader VM could respond to the cast 365 action by requiring confirmation, e.g., by displaying a window that inquires "Are you sure?" to protect against a vote being case 360 by accidental or unintended operation of the Cast button without a second confirming action by the voter.

Further, if an undervote or overvote is present, then reader VM may be programmed to not accept a cast 365 action, e.g., in the absolute by automatically returning 385 the ballot or by requiring the voter to confirm that the undervote or overvote is intended regardless of the consequence. For example, a window may be displayed including buttons that can be touched or pressed and that present the choices such as:

"Submit ballot as is. I realize there is/are overvoted contests and measures." and "Submit ballot as is. I realize there is/are undervoted contests and measures."

Such action and choices may be provided whether or not an undervote or overvote would result in invalidation of a vote in the particular contest undervoted or overvoted, or in invalidation of the entire ballot. Alternatively, if an undervote, overvote or other error is found that would result in the ballot being disqualified, such ballot may be ejected, i.e. returned to the voter so that no invalid ballot is accepted.

If the voter is not satisfied 360 for any reason, he may initiate action to return 385 the ballot so that he can change it, correct it, or obtain and mark a replacement ballot (repeat of 310, 315) and then submit 320 the changed, corrected or replacement ballot as described. Even if the voter is satisfied 360, or even if the ballot contains an error such as an undervote or an overvote, the voter may elect for return 385 of the ballot for manual deposit 390 in the secure collection box.

Process 300 ends 399 when the ballot is collected 385 or deposited 390. Thereafter, the accumulated ballot images and/or voting results may be read, out for tallying the result of the election. It is noted that process 300 may include a step 395 following the cast ballot step 360 for preventing the ballot images and/or accumulated results from being read out before a predetermined date, i.e. a controlled release date. This feature beneficially allows the process to be utilized for advance voting, absentee ballot voting and/or provisional ballot voting wherein ballots may be submitted in advance of the day of the election, wherein the ballots may be authenticated and processed 300 as received or at a convenient time, and need not be held until the election day, thereby easing the work of election officials on election day and facilitating a prompt processing of the vote and announcing of an election result.

The present arrangement has the potential to reduce instances of voters being disenfranchised by improper marking of the ballot, by mistake and/or by confusion. The present arrangement also has the potential to reduce unintentional undervoting as well as overvoting that can cause a vote in a contest or an entire ballot to be disqualified. Also importantly, the voter is provided the opportunity for return of his marked ballot so that any error or unintended vote can be rectified before the ballot is irrevocably submitted.

FIG. 5 is an example of a ballot counting instruction screen 250 that may be displayed in connection with the reading of optically-readable ballots by the example reader of FIG. 1. Count Ballot screen 250 provides a user interface that includes plural regions 252, 254, 256 relating to various aspects of the ballot counting process, is of the sort that would be utilized by an election official setting up reader VM for use at a polling place as described and/or for otherwise scanning ballots, e.g., absentee and/or provisional ballots received at an election office.

Scanner Setting region 252 of screen 250 provides a user interface that includes buttons and windows for identifying the desired data source and mode, for identifying the paper size of the ballots to be scanned, selecting Duplex (two sided) scanning, and specifying the resolution at which scanning is to be done. Typically, the Paper Size selection is provided by a window that opens to allow selection for various standard size papers, e.g., 8.5×11 inch (US letter), 8.5×14 inch (US legal), international sizes (A4, B4, etc.), and the like.

Ballot Setting region 254 provides various options for controlling the manner in which reader VM is to be used, other than for ballot counting provided for in region 256. Several choices are typically available in ballot setting region 256. Check Ballot Data could be utilized, for example, to read ballots to check for undervoting and overvoting, and/or for missing pages. Scan Blank Ballots could be utilized, for example, to scan a set of ballots to record the ballot identifiers thereof for later checking to authenticate ballots that are later scanned for counting the voting selections marked thereon. Test scanning could be utilized for scanning a one or more specially marked ballots that contain various voting errors and/or degrees of filling in of the voting mark sense areas for testing and/or verifying the operation of reader VM in accordance with the selected checking and/or counting criteria.

Ballot Counting region 256 provides various options for specifying how votes will be determined and counted. A box is provided for specifying the directory and file name under which the scanned ballot images stored, and may also allow specifying the directory and files wherein vote tabulations are to be stored. The Acceptable Filled Percentage selection allows election officials t set a variable to select the percentage of fill in that must exist in a mark sense area before the area will be counted as having been marked, i.e. as a valid vote, it being noted that this value would typically set to a standard value by law or rule prior to an election and would not be set arbitrarily. This selection also allows testing of the vote counts where the ballots are counted using the standard percentage value and are then recounted at a slightly higher and at a slightly lower percentage to identify potentially ambiguously marked mark sense spaces that might warrant inspection.

Ballot Counting region 256 also provides two options for processing the votes: i.e. to Scan & Count ballots 258, which indicates that a set of ballots are scanned, imaged, images stored, and marked votes thereon counted with the voting tabulated, and to Recount Scanned Ballots 257, which indicates that a set of ballots previously scanned are recounted from the ballot images thereof that were stored in a previous scanning. The latter operation 257 is much faster because it does not include the physical scanning of the paper ballot forms, but may be entirely electronic, e.g., reprocessing the stored TIFF or BITMAP ballot images. The latter operation typically would be utilized to recount the ballots at the mark sense fill percentages that are higher and lower than the standard percentage.

Apparatus and method for determining marked spaces based upon percentage of fill are described in U.S. patent application Ser. No. 10/410,824 entitled "ELECTRONIC VOTING METHOD FOR OPTICALLY SCANNED BALLOT" referred to above.

Figure 6:
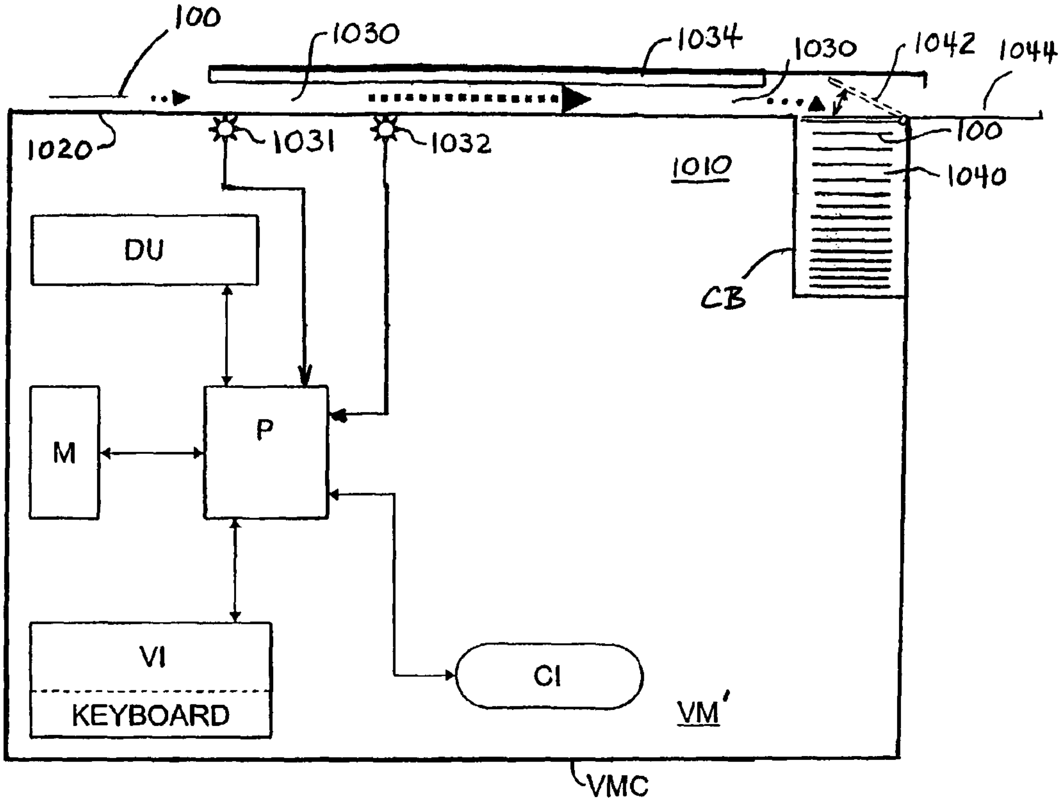
FIG. 6 is a schematic block diagram of an example alternative embodiment of a reader as for an optically-readable ballot.

FIG. 6 is a schematic block diagram of an example alternative embodiment of a reader VM' as for an optically-readable ballot 100. Ballot reader VM' is like ballot reader VM in all respects except the manner in which the physical ballot 100 is handled. Reader VM' includes a transport path 1030 in which ballots 100 move in one direction, e.g., from left to right in the FIGURE, as indicated by the dashed arrows. A pivotable member 1042 is provided at the end of transport path 1030 at ballot collection box 1040 for appropriately directing the physical ballot 100. Pivotable member 1042 is normally pivoted downward or into a closed position (shown in solid line) thereby covering the entrance into collection container 1040. In the closed position, member prevents ballots from being placed into or removed from collection box 1040.

If a ballot is cast, then pivotable member 1042 is pivoted upward (shown dashed) into an open position for opening collection box 1040 and directing the cast ballot 100 into collection box 1040 as ballot 100 is moved along transport path 1030. In the open position, member 1042 preferably closes the rightward end of transport path 1030. Preferably, pivotable member 1042 returns to the downward or closed position after the cast ballot 100 has been moved into collection box 1040.

If a ballot 100 is rejected or is for any reason not cast, then pivotable member 1042 remains in the pivoted downward or closed position, and collection box 1040 is closed so that as ballot 100 cannot enter therein and is returned to the voter. As rejected or uncast ballot 100 is moved along transport path 1030, it exits transport path 1030 to position 1044, e.g., a tray or rack or the like, from which the voter may retrieve the rejected or uncast ballot 100 for correcting and/or changing it. The corrected and/or changed ballot 100 may then be submitted again as described herein.

While the present invention has been described in terms of the foregoing example embodiments, variations within the scope and spirit of the present invention as defined by the claims following will be apparent to those skilled in the art. For example, the steps set forth in process 300 need not be performed in the order illustrated, but may be performed in any other suitable order, and certain steps may be omitted it desired. For example, steps 330-345 may be performed in any order and may be performed substantially contemporaneously. In such case, the processing of the ballot image may interleave portions of each step in performing the processing of the ballot image.

Further, steps 370-380 may be performed in any order and may be performed substantially contemporaneously. In such case, for example, the processing steps of storing 370 the vote and the ballot image and tallying 375 the vote may be performed electronically and contemporaneously with the physical step 380 of moving the ballot to the collection container. Moreover, tallying 375 the vote may comprise storing the decoded vote as read from the processed ballot image, and may also comprise updating an accumulated total of the votes of ballots previously cast to include the ballot presently being cast.

Tallying 375 may also include communicating the ballot image, the decoded vote therefrom and or the accumulated vote tally via communication interface CI to a computer separate from the ballot reader VM, e.g., contemporaneously or at a later time. The ballot may be imaged or read, the terms as used herein being substantially functionally interchangeable with respect to sensing and converting the information on a physical ballot into an electronic form. A ballot image may be an electronic form of an actual image of a physical ballot or of selected portions of a ballot or may be an electronic record containing information obtained from an actual image of a ballot.

The term contest is used herein to include any part of a ballot, whether that may be to make a choice from one or more candidates for an office or position, to vote on a question, proposition, measure, referendum, constitutional amendment, or any other matter.

Buttons and boxes may, if for receiving instructions from a user, respond to touching or pressing, e.g., on a touch screen display, or by positioning a cursor and clicking, e.g., using a computer mouse, accessing via the tab key and acting via the enter key, pressing certain keys or combinations thereof, or any other suitable arrangement. Boxes or windows are typically for the entry of information, typically by entry of alphanumeric information from a keyboard or by pointing an clicking to open a window presenting a list from which a choice may be selected.

Finally, numerical values stated are typical or example values, and are not limiting values. Voting selections may be to vote for up to a particular number of selections, to rank selections, to vote cumulatively or in any other manner.

What is claimed is:

1. A ballot reader for reading an optically-readable ballot comprising:

an imager for imaging the optically-readable ballot;

a processor for processing the ballot image, wherein the processing includes checking the ballot image for identifying an undervote and/or an overvote;

a display for displaying the processed ballot image including any identified undervote and/or overvote; and means for casting the ballot and for returning the ballot uncast.

2. The ballot reader of claim 1 wherein said imager includes a transport path for receiving the ballot to be imaged, for moving the ballot to a container if the ballot is cast, and for returning the ballot if the ballot is not cast.

3. The ballot reader of claim 1 wherein said processor processes the ballot image to determine whether the ballot is authentic, or to determine whether all pages of the ballot have been imaged, or to determine whether the ballot is authentic and all pages of the ballot have been imaged.

4. The ballot reader of claim 1 wherein said processor processes the ballot image to determine the voting selections marked thereon, wherein the determined marked voting selections are stored in a memory if the ballot is cast and are not stored if the ballot is not cast.

5. The ballot reader of claim 1 wherein the ballot image displayed on said display includes a conspicuous display of any identified undervote and/or overvote.

6. The ballot reader of claim 5 wherein the conspicuous display of any identified undervote and/or overvote is indicated by any one or more of a highlighted area, a highlighted outline, a contrasting outline, a distinct outline, a contrasting color, a blinking area, and/or a flashing area.

7. The ballot reader of claim 1 wherein said display comprises a touch screen display, and wherein said means for casting the ballot and for returning the ballot uncast comprises a first region on said touch screen for casting the ballot and a second region on said touch screen for not casting the ballot.

8. The ballot reader of claim 1 wherein said means for casting the ballot comprises:

a memory for storing the ballot image if the ballot is cast; and a container for receiving the ballot if the ballot is cast.

9. The ballot reader of claim 8 wherein the ballot image is stored in said memory and the ballot is received in said container only if the ballot is cast.

10. The ballot reader of claim 1 further comprising a communication interface for communicating a ballot image and/or a voting selection determined from a ballot image to a computer separate from said ballot reader.

11. The ballot reader of claim 1 further comprising an interface for impaired voters including any one or more of voice recognition apparatus, a Braille keyboard, a pen with writing recognition interface, and means for confirming information displayed on said display and information entered by a voter.

12. The ballot reader of claim 11 wherein said means for confirming includes any one or more of an audible response device, a headphone, a loudspeaker, a Braille device and/or a tactile device.

13. A method for reading an optically-readable ballot on which a voting selection may be marked comprising:

imaging the optically-readable ballot;

processing the ballot image including checking the ballot image for identifying an undervote and/or an overvote;

displaying the processed ballot image including any identified undervote and/or overvote; and casting the ballot or returning the ballot uncast.

14. The method of claim 13 wherein said imaging includes receiving the ballot to be imaged, moving the ballot to a container if the ballot is cast, and returning the ballot if the ballot is not cast.

15. The method of claim 13 wherein said processing the ballot image includes determining whether the ballot is authentic, or determining whether all pages of the ballot have been imaged, or determining whether the ballot is authentic and all pages of the ballot have been imaged.

16. The method of claim 13 wherein said processing the ballot image includes determining the voting selections marked thereon, and wherein said casting the ballot includes storing the determined marked voting selections and not storing the determined marked voting selections if the ballot is returned.

17. The method of claim 13 wherein said displaying the ballot image includes conspicuously displaying any identified undervote and/or overvote.

18. The method of claim 17 wherein said conspicuously displaying any identified undervote and/or overvote includes displaying any one or more of a highlighted area, a highlighted outline, a contrasting outline, a distinct outline, a contrasting color, a blinking area, and/or a flashing area.

19. The method of claim 13 wherein said displaying comprises displaying on a touch screen, and wherein said casting the ballot and returning the ballot uncast comprises a first region on said touch screen for said casting the ballot and a second region on said touch screen for said returning the ballot.

20. The method of claim 13 wherein said casting the ballot comprises:

storing the ballot image if the ballot is cast; and receiving the ballot in a container if the ballot is cast.

21. The method of claim 20 wherein said storing the ballot image and said receiving the ballot in a container is performed only if the ballot is cast.

22. The method of claim 13 further comprising communicating a ballot image and/or a voting selection determined from a ballot image to a computer separate from said ballot reader.

23. The method of claim 13 wherein said processing the ballot image includes determining whether the ballot is authentic by comparing a ballot identifier included in the ballot image with a list of known authentic ballot identifiers stored in the ballot reader.

24. The method of claim 13 further comprising receiving information from an impaired voter via any one or more of voice recognition apparatus, a Braille keyboard, and a pen with writing recognition interface.

25. The method of claim 13 further comprising confirming to an impaired voter information displayed by said displaying via any one or more of an audible response device, a headphone, a loudspeaker, a Braille device and a tactile device.

* * * * *